(12) United States Patent
Yamamoto

(10) Patent No.: US 10,137,845 B2
(45) Date of Patent: Nov. 27, 2018

(54) TETHER CLIP AND STRUCTURE FOR COUPLING THE TETHER CLIP TO A PILLAR GARNISH

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/310,291

(22) PCT Filed: Jul. 24, 2015

(86) PCT No.: PCT/JP2015/071087
§ 371 (c)(1),
(2) Date: Nov. 10, 2016

(87) PCT Pub. No.: WO2016/017539
PCT Pub. Date: Feb. 4, 2016

(65) Prior Publication Data
US 2017/0253195 A1    Sep. 7, 2017

(30) Foreign Application Priority Data
Jul. 30, 2014   (JP) ................................ 2014-154499

(51) Int. Cl.
*B60R 13/02*    (2006.01)
*B60R 21/213*   (2011.01)
*F16B 19/00*    (2006.01)

(52) U.S. Cl.
CPC .......... *B60R 13/0206* (2013.01); *B60R 13/02* (2013.01); *B60R 13/025* (2013.01);
(Continued)

(58) Field of Classification Search
CPC ... B60R 13/0206; B60R 21/216; Y10T 24/30; Y10T 24/309; Y10T 24/303; Y10T 24/42; F16B 5/065
See application file for complete search history.

(56) References Cited

U.S. PATENT DOCUMENTS

2004/0245798 A1* 12/2004 Tokunaga ........... B60R 13/0206
                                                           296/39.1
2010/0072735 A1*  3/2010 Kirchen .............. B60R 13/0206
                                                           280/728.2
(Continued)

FOREIGN PATENT DOCUMENTS

JP      2011-157054 A     8/2011
JP      2011-255829 A    12/2011
(Continued)

OTHER PUBLICATIONS

Machine Translation of JP 2013-137049 Retrieved from www4.j-platpat.inpit.go.jp Oct. 12, 2017.*

Primary Examiner — Robert Sandy
Assistant Examiner — Michael S Lee
(74) Attorney, Agent, or Firm — Oliff PLC

(57) ABSTRACT

A tether has a pair of guide plates. The pair of guide plates has two sides. A distance between points located on the two sides increases, as the points on the two sides approach a tip of the tether. The tether may have elastic branches. The pair of guide plates may have protrusions protruding toward an anchor. The tether may be made long by curving a tether intermediate portion. The tether may have a second guide plate and a third guide plate. When a pillar garnish is moved in a direction away from a pillar, the two sides of the guide plates are brought into contact with a rim portion of a tether housing portion defining the tether inserting aperture, thereby preventing the tether from rotating about a center axis line of the clip and the anchor to pass through the tether
(Continued)

inserting aperture. When a bottom wall of the tether housing portion comes to a tether portion located between the guide plates and the anchor, the elastic branches and the protrusions prevent rotation of the tether. The second and third guide plates also prevent rotation of the tether.

8 Claims, 20 Drawing Sheets

(52) U.S. Cl.
CPC ............ *B60R 21/213* (2013.01); *F16B 19/00* (2013.01); *Y10T 24/30* (2015.01); *Y10T 24/309* (2015.01); *Y10T 24/42* (2015.01)

(56) References Cited

U.S. PATENT DOCUMENTS

| | | | |
|---|---|---|---|
| 2013/0168515 A1* | 7/2013 | Yamamoto | B60R 13/0206 248/231.81 |
| 2015/0211555 A1 | 7/2015 | Yamamoto | |
| 2016/0375852 A1* | 12/2016 | Yamamoto | B60R 21/216 24/297 |

FOREIGN PATENT DOCUMENTS

| | | |
|---|---|---|
| JP | 2013-137049 A | 7/2013 |
| JP | 2015-140118 A | 8/2015 |

\* cited by examiner

84 STEP-1

STEP-1

STEP-2.3

STEP-4

STEP-5

STEP-5

STEP-6

STEP-6

TETHER CLIP AND STRUCTURE FOR COUPLING THE TETHER CLIP TO A PILLAR GARNISH

TECHNICAL FIELD OF THE INVENTION

The present invention relates to a tether clip and a structure (which may be called an apparatus) for coupling the tether clip to a pillar garnish.

BACKGROUND OF THE INVENTION

Patent Document 1 discloses a tether clip and a structure for coupling the tether clip to a pillar garnish.

The tether clip is coupled to a front pillar garnish (simply, a pillar garnish, hereinafter) and is used for installing the pillar garnish coupled with the tether clip to a front pillar (simply, a pillar, hereinafter) of a vehicle. At the time of deployment of a curtain airbag (simply, a CSA, hereinafter, where the "CSA" means a "curtain shield airbag"), the tether clip allows the pillar garnish to be moved in a direction away from the pillar until an anchor of the tether clip is brought into contact with a rim portion of a tether housing portion defining a tether clip inserting aperture (a tether inserting aperture, hereinafter) thereby producing a gap for deployment of the CSA between the pillar garnish and the pillar. The tether clip restricts the pillar garnish from moving further in the direction away from the pillar, thereby preventing the pillar garnish from moving freely into a passenger compartment.

RELATED ART DOCUMENT

Patent Document 1: Patent Publication JP 2011-157054

BRIEF SUMMARY

Problems to be Solved

In order to obtain a sufficient gap for deployment of the CSA in a conventional tether clip, if the tether clip is made long in a direction perpendicular to a longitudinal direction of the pillar garnish, a relatively large space will be necessary in the tether housing portion in the direction perpendicular to the longitudinal direction of the pillar garnish. In some cases, it may be difficult to obtain such a space.

As a substitute for the above, if a curving direction and an extending direction of a tether of the tether clip are directed in the longitudinal direction of the pillar garnish, at the time of deployment of the CSA, the tether may be pushed by the pillar garnish in the direction perpendicular to the extending direction of the tether and may be rotated about a center axis line of the clip. One reason why the tether may be rotated is that a shaft (i.e., a leg) of the tether clip has a circular cross section and thus the shaft is rotatable about the center axis line of the clip in a clip fixing aperture which is circular. Another reason why the tether may be rotated is that the tether is curved and thus the tether may be pushed by the rim portion of the tether housing portion defining the tether clip inserting aperture at a tether portion offset from the center axis line of the clip. If the tether is rotated about the center axis line of the clip by an amount of about ninety degrees, when the tether is deformed to be substantially straight at the time of deployment of the CSA, a longitudinal direction of the anchor which is perpendicular to the extending direction of the tether and a longitudinal direction of the tether inserting aperture are caused to coincide with each other. As a result, the anchor may pass through the tether inserting aperture and the pillar garnish may disengage the tether clip so that it moves freely.

An object of the invention is to provide a tether clip that can stop rotation of a tether about a center axis line of the clip at a certain rotational angle smaller than nearly ninety degrees and at a certain position on a way of the movement of a pillar garnish in a direction away from the pillar, and that can forcibly return the certain rotational angle of the tether to a nearly zero degree while the pillar garnish is being moved in the direction away from the pillar further from that certain position at which rotation of the tether has been stopped, and a structure for coupling the tether clip to the pillar garnish.

Means for Solving the Problems

A clip and a pillar garnish fixing apparatus for achieving the above object can take the aspects or structures described below, where reference numerals in brackets correspond to reference numerals shown in the accompanying drawings. However, it is to be understood that the present invention is not limited to the aspects defined by the reference numerals in brackets. In the aspects below, relationships between the aspects and first to third embodiments described later will be referred to.

In a first aspect, a tether clip (10) is coupled to a pillar garnish (80) having a tether housing portion (82) provided with a bottom wall (84) having a tether inserting aperture (86). The tether clip (10) includes a tether (60) and an anchor (62). The tether (60) includes a tip (60b), a seat-side end (60c) and a tether intermediate portion (60a). The tether (60) extends along one plane. The anchor (62) is connected to the tip (60b) of the tether and extends in a direction perpendicular to the one plane.

A pair of guide plates (64) is provided at the tether intermediate portion (60a). The pair of guide plates (64) extends parallel to the one plane. Respective guide plates of the pair of guide plates (64) extend in directions away from the tether intermediate portion (60a) and opposite to each other.

The pair of guide plates (64) has two sides (64a) located on opposite sides of a guide plate-provided portion (60f) of the tether intermediate portion (60a) and opposing each other. A distance between points located on the two sides (64a) increases, as the points located on the two sides (64a) approach the tip (60b) of the tether.

The first aspect corresponds to a first embodiment and is also applicable to a second embodiment and a third embodiment.

In a second aspect, in the first aspect above, an elastic branch (66) is provided at a tether portion (60g) located between the pair of guide plates (64) and the anchor (62).

The elastic branch (66) extends in the direction along the one plane. The elastic branch (66) extends in a direction away from the tether portion (60g) located between the pair of guide plates (64) and the anchor (62), and toward the anchor (62).

The second aspect corresponds to the first embodiment.

In a third aspect, in the first aspect above, a protrusion (64d) protruding in a direction toward the anchor (62) is formed at a portion of each guide plate of the pair of guide plates (64) opposing the anchor (62).

The third embodiment corresponds to the second embodiment and is also applicable to the third embodiment.

In a fourth aspect, in the third aspect above, a space is provided between an anchor-side end of the protrusion (64d) and the anchor (62). The space is larger than a thickness of the bottom wall (84) of the tether housing portion (82) and causes the protrusion (64d) of at least one of the pair of guide plates (64) to enter the tether inserting aperture (86) when a center axis line of the tip (60b) of the tether is inclined relative to a line perpendicular to the bottom wall (84) of the tether housing portion (82).

The fourth aspect corresponds to the second embodiment and is also applicable to the third embodiment.

In a fifth aspect, in the third aspect above, at the portion of each guide plate of the pair of guide plates (64) opposing the anchor (62), and at a portion of each guide plate of the pair of guide plates closer to the tether intermediate portion (64a) than the protrusion (64d), a concavity (64e) concave in a direction further away from the anchor (62) than the anchor-side end of the protrusion (64d) is formed.

The fifth aspect corresponds to the second embodiment and is also applicable to the third embodiment.

In a sixth aspect, in the third aspect above, the tether intermediate portion (60a) includes a first portion (60h) extending in a direction upward and away from the anchor (62) from the seat-side end (60c) of the tether, a second portion (60i) extending in a direction upward and toward the anchor (62) from an upper end of the first portion (60h), a third portion (60j) extending in a direction downward and toward the anchor (62) from an upper end of the second portion (60i), and a fourth portion (60k) extending in the direction upward and toward the anchor (62) from a lower end of the third portion (60j) to the tip (60b) of the tether.

The sixth aspect corresponds to the third embodiment.

In a seventh aspect, in the sixth aspect above, at least at one portion of the first, second and third portions (60h, 60i and 60j) of the tether intermediate portion (60a), at least one of a second guide plate (76) and a third guide plate (78) which place the tether intermediate portion (60a) therebetween and extend in directions opposite to each other is provided. The pair of guide plates (64) is provided at the fourth portion (60k) of the tether intermediate portion (60a).

The seventh aspect corresponds to the third embodiment.

In an eighth aspect, in the seventh aspect above, the at least one of the second guide plate (76) and the third guide plate (78) is discontinuous with the pair of guide plates (64) provided at the fourth portion (60 k) in a direction along an extending direction of the tether intermediate portion (60a).

The eighth aspect corresponds to the third embodiment.

In a ninth aspect, in the first aspect above, the tether intermediate portion (60a) includes a first portion (60h) extending in a direction upward and away from the anchor (62) from the seat-side end (60c), a second portion (60i) extending in a direction upward and toward the anchor (62) from an upper end of the first portion (60h), a third portion (60j) extending in a direction downward and toward the anchor (62) from an upper end of the second portion (60i), and a fourth portion (60k) extending in the direction upward and toward the anchor (62) from a lower end of the third portion (60j) to the tip (60b) of the tether.

The ninth aspect corresponds to the third embodiment.

In a tenth aspect, in the ninth aspect above, at least at one of the first, second and third portions (60h, 60i and 60j) of the tether intermediate portion (60a), at least one of a second guide plate (76) and a third guide plate (78) which place the tether intermediate portion (60a) therebetween and extend in directions opposite to each other is provided.

The pair of guide plates (64) is provided at the fourth portion (60k) of the tether intermediate portion (60a).

The tenth aspect corresponds to the third embodiment.

In an eleventh aspect, in the tenth aspect above, the at least one of the second guide plate (76) and the third guide plate (78) is discontinuous with the pair of guide plates (64) provided at the fourth portion (60k) in a direction along an extending direction of the tether intermediate portion (60a).

The eleventh aspect corresponds to the third embodiment.

In a twelfth aspect, a structure (1) for coupling a tether clip to a pillar garnish includes the tether clip (10) according to any one of the first, second, third—fifth, sixth—eighth and ninth—eleventh aspects above including the anchor (62) having a rectangular configuration, and the pillar garnish (80) having the tether housing portion (82) with the bottom wall (84) where the tether inserting aperture (86) is perforated. The tether clip (10) is coupled to the pillar garnish (80) such that an extending direction of the tether (60) coincides with a longitudinal direction of the pillar garnish. A long side of the tether inserting aperture (86) is longer than a maximum of the distance between the opposing two sides (64a) of the pair of guide plates (64). A short side of the tether inserting aperture (86) is shorter than the maximum of the distance between the opposing two sides (64a) of the pair of guide plates (64).

The twelfth aspect corresponds to the first embodiment and is applicable to the second and third embodiments.

In a thirteenth aspect, in the twelfth aspect above, the tether housing portion (82) includes an opening (82a) directed in a longitudinal direction of the pillar garnish. The tether (60) extends from an interior to an exterior of the tether housing portion (82) and the anchor (62) is located outside the tether housing portion (82) in a state where the tether clip (10) has been coupled to the pillar garnish (80).

The thirteenth aspect corresponds to the first embodiment and is applicable to the second and third embodiments.

In a fourteenth aspect, in the twelfth aspect above, a protrusion (64d) protruding in a direction toward the anchor (62) is formed at a portion of the pair of guide plates (64) opposing the anchor (62). At an outside surface of the bottom wall (84) of the tether housing portion (82), a rotational stopper (84a), which the protrusion (64a) of the pair of guide plates can be brought into engagement with and which stops rotation of the tether (60) relative to the bottom wall (84) of the tether housing portion when the protrusion (64a) of the pair of guide plates engages the rotational stopper (84a), is provided.

The fourteenth aspect corresponds to the second embodiment and is applicable to the third embodiment.

Technical Advantages

According to the first aspect above, the technical advantages described below are obtained.

More particularly, when the pillar garnish is moved in a direction in which the pillar garnish is drawn out from the tether clip, in some cases, the tether is pushed by the pillar garnish, so that the tether clip is rotated about a center axis line of the clip.

However, in the first aspect above, since the pair of guide plates is provided at the tether, the two sides of the pair of guide plates are brought into contact with the rim portion of the tether housing portion defining the tether inserting aperture before the tether is rotated nearly ninety degrees about the center axis line of the clip, so that the tether is prevented from being rotated about the center axis line of the clip more than the angle at which the two sides are brought into contact with the rim portion of the tether housing portion defining the tether inserting aperture.

When the pillar garnish is further moved in the direction in which the pillar garnish is drawn out from the tether clip, contact points of the two sides of the pair of guide plates with the rim portion of the tether housing portion defining the tether inserting aperture approach the tip of the tether. Since the distance between the two sides is wider toward the tip of the tether and is restricted to the length of the short side of the tether inserting aperture, the rotational angle of the tether about the center axis line of the clip is returned to a nearly zero degree, as the contact points of the two sides with the rim portion of the tether housing portion defining the tether inserting aperture approach the tip of the tether. As described above, on a way of the movement of the pillar garnish in the direction in which the pillar garnish is drawn out from the tether clip, rotation of the tether about the center axis line of the clip is stopped, and when the pillar garnish is further moved, the angle between the longitudinal direction of the anchor and the longitudinal direction of the tether inserting aperture is rectified so as to approach a right angle. As a result, the longitudinal direction of the anchor and the longitudinal direction of the tether inserting aperture are prevented from being made coincident with each other, whereby the anchor is prevented from passing through the tether inserting aperture.

According to the second aspect above, since the elastic branch is provided, when the anchor is brought into contact with the inside surface of the bottom wall of the tether housing portion at the time of deployment of the CSA, the elastic branch enters the tether inserting aperture and stops rotation of the tether. Therefore, even when the bottom wall of the tether housing portion comes to a tether portion located between the pair of guide plates and the anchor and thus the pair of guide plates cannot stop rotation of the tether, the elastic branch can stop rotation of the tether about the center axis line of the clip and rotation of the anchor relative to the bottom wall of the tether housing portion. Therefore, a perpendicularity between the longitudinal direction of the anchor and the longitudinal direction of the tether inserting aperture can be maintained by the elastic branch. As a result, the longitudinal direction of the anchor and the longitudinal direction of the tether inserting aperture are prevented from becoming coincident with each other, and thus, the anchor is prevented from passing through the tether inserting aperture.

Since rotation of the tether is stopped not by a rigid branch but by the elastic branch, coupling the tether clip to the pillar garnish is possible. In order to install the tether clip to the pillar garnish, first, the anchor is caused to pass through the tether inserting aperture to enter the tether housing portion, and then, the elastic branch is pressed against the outside surface of the bottom wall of the tether housing portion so as to be elastically deformed to be flat. While maintaining the flat state, the tether clip is rotated by ninety degrees relative to the pillar garnish, so that the elastic branch and the pair of guide plates can pass through the tether inserting aperture to enter the tether housing portion.

According to the third aspect above, since the protrusion is provided to each guide plate of the pair of guide plates, when the pillar garnish is moved away from the pillar while rotation of the tether relative to the bottom wall of the tether housing portion is being restricted by the pair of guide plates, the protrusion can smoothly enter the tether inserting aperture, following the pair of guide plates. Further, when the pillar garnish is moved away from the pillar while rectifying the curved configuration of the tether to a non-curved, substantially straight configuration, a spring force for returning the tether to an original, curved configuration acts on the tether, so that the pair of guide plates is inclined relative to the bottom wall of the tether housing portion. Due to the inclination, one guide plate of the pair of the guide plates enters the tether inserting aperture, whereby not only rotation of the tether about the center axis line of the clip but also rotation of the tip of the tether about a center axis line of the tip of the tether relative to the bottom wall of the tether housing portion are prevented. In a case where the protrusion is provided to each guide plate of the pair of guide plates, the elastic branch of the second aspect is not required to be provided.

According to the fourth aspect above, the space is provided between the protrusion and the anchor. The space causes the protrusion of at least one guide plate of the pair of guide plates to enter the tether inserting aperture when a center axis line of the tip of the tether is inclined relative to a line perpendicular to the bottom wall of the tether housing portion. As a result, when the pillar garnish is moved in a direction away from the tether clip and the anchor is brought into contact with the inside surface of the bottom wall of the tether housing portion, the protrusion of the at least one guide plate of the pair of guide plates enters the tether inserting aperture and can stop rotation of the anchor relative to the bottom wall of the tether housing portion. Further, since the space provided between the protrusion and the anchor is larger than the thickness of the bottom wall of the tether housing portion, in spite of the fact that the protrusion is nearly rigid, the tether can be installed to the tether housing portion. In that case, first, the anchor is inserted into the tether housing portion through the tether inserting aperture, and then, while maintaining a state where a center line of the tip of the tether is perpendicular to the bottom wall of the tether housing portion, the tether is rotated about the center line of the tip of the tether by ninety degrees, so that the pair of guide plates with the protrusion can be inserted into the tether housing portion through the tether inserting aperture.

According to the fifth aspect above, since the concavity is formed at the portion of each guide plate of the pair of guide plates closer to the tether intermediate portion than the protrusion, shrinkage of a material at a thick portion located closer to the tether intermediate portion than the protrusion and deformation of the protrusion due to the shrinkage of the material at the thick portion can be suppressed. Therefore, accuracy of the protrusion in shape and dimension is high.

According to the sixth aspect or the ninth aspect above, since the tether intermediate portion includes the first, second, third and fourth portions, in FIG. 20 described later, the tether can take a shape curved in right-left and up-down directions so that a length of the tether can be long. As a result, a size of a gap formed between the pillar garnish and the pillar at the time of expansion and deployment of the CSA can be large so that the CSA can be expanded and deployed easily and surely.

According to the seventh aspect or the tenth aspect above, at least at one portion of the first, second and third portions of the tether intermediate portion, at least one of the second guide plate and the third guide plate which place the tether intermediate portion therebetween and extend in directions opposite to each other is provided. Therefore, even if the tether is made long, the at least one of the second guide plate and the third guide plate can be brought into engagement with the rim portion of the tether housing portion defining the tether inserting aperture before the pair of guide plates engages the rim portion. As a result, the at least one of the second guide plate and the third guide plate can stop rotation of the tether about the center axis line of the clip.

According to the eighth aspect or the eleventh aspect above, since the at least one of the second guide plate and the third guide plate is discontinuous with the pair of guide plates, in spite of the fact that the at least one of the second guide plate and the third guide plate is provided, deformability of the tether can be maintained. As a result, the effect obtained by making the tether long, more particularly, the effect that the opening amount of the pillar garnish at the time of deployment of the CSA can be surely obtained.

According to the twelfth aspect above, since the long side of the tether inserting aperture is longer than the maximum of the distance between the opposing two sides of the pair of guide plates, in spite of the fact that the pair of guide plates is provided, the tether clip can be coupled to the pillar garnish. Further, since the short side of the tether inserting aperture is shorter than the maximum of the distance between the opposing two sides of the pair of guide plates, at the time of deployment of the CSA, the two sides of the pair of guide plates are brought into contact with the rim portion of the tether housing portion defining the tether inserting aperture before the tether is rotated nearly ninety degrees about the center axis line of the clip, so that the tether is prevented from being rotated about the center axis line of the clip more than the angle at which the two sides are brought into contact with the rim portion of the tether housing portion defining the tether inserting aperture. When the pillar garnish is further moved in the direction away from the tether clip than that state, the distance between the two sides which is increased in the direction toward the tip of the tether is restricted by the rim portion of the tether housing portion defining the tether inserting aperture, whereby the rotational angle of the tether about the center axis line of the clip is returned to a nearly zero degree.

According to the thirteenth aspect above, since the anchor is located outside the tether housing portion, in spite of the fact that the tether is long, the tether clip can be coupled to the pillar garnish without being accompanied by interference of the anchor and the guide plates with side walls of the tether housing portion.

According to the fourteenth aspect above, by causing the protrusion to engage with the rotational stopper formed at the bottom wall of the tether housing portion, rotation of the tether about the center axis line of the clip and rotation of the tip of the tether relative to the bottom wall of the tether housing portion can be surely prevented.

DETAILED DESCRIPTION

A tether clip 10 and a structure 1 for coupling the tether clip to a pillar garnish, according to the present invention will be explained with reference to the accompanying drawings.

This invention includes first, second and third embodiments. The first embodiment corresponds to a case where a pair of guide plates is provided. The first embodiment includes a case where an elastic branch (which may be called an elastic piece) is provided and a case where an elastic branch is not provided. The drawings show the first embodiment in the case where the elastic branch is provided. The second embodiment corresponds to a case where a protrusion is provided to the pair of guide plates. The second embodiment corresponds to a case where a tether is made long. The third embodiment corresponds to a case where the tether is made long and second and third guide plate are provided to the tether.

Figure 18:
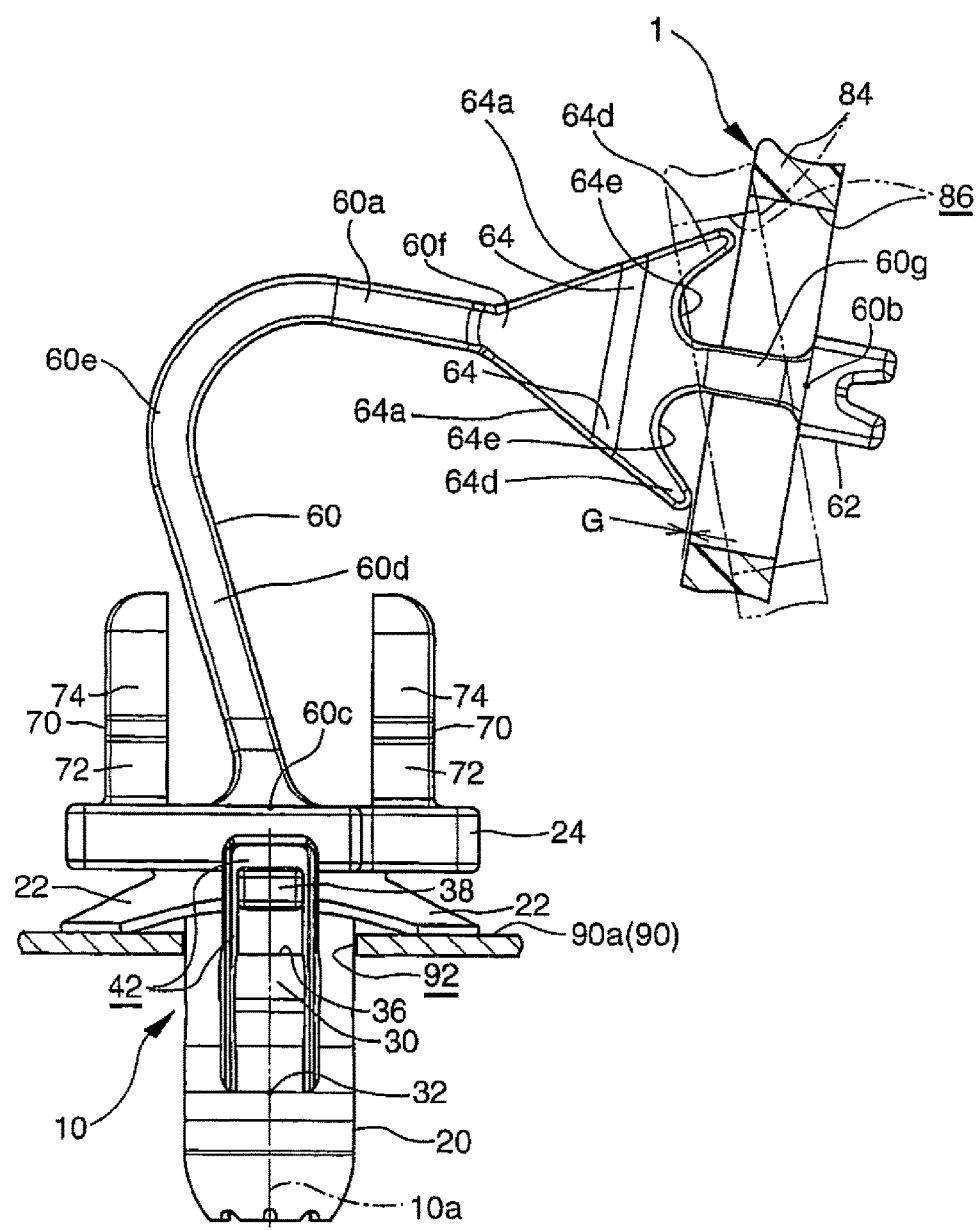
FIG. 18 is a side view of a tether clip according to a second embodiment of the present invention and a structure for coupling the tether clip according to the second embodiment to a pillar garnish.
Figure 19:
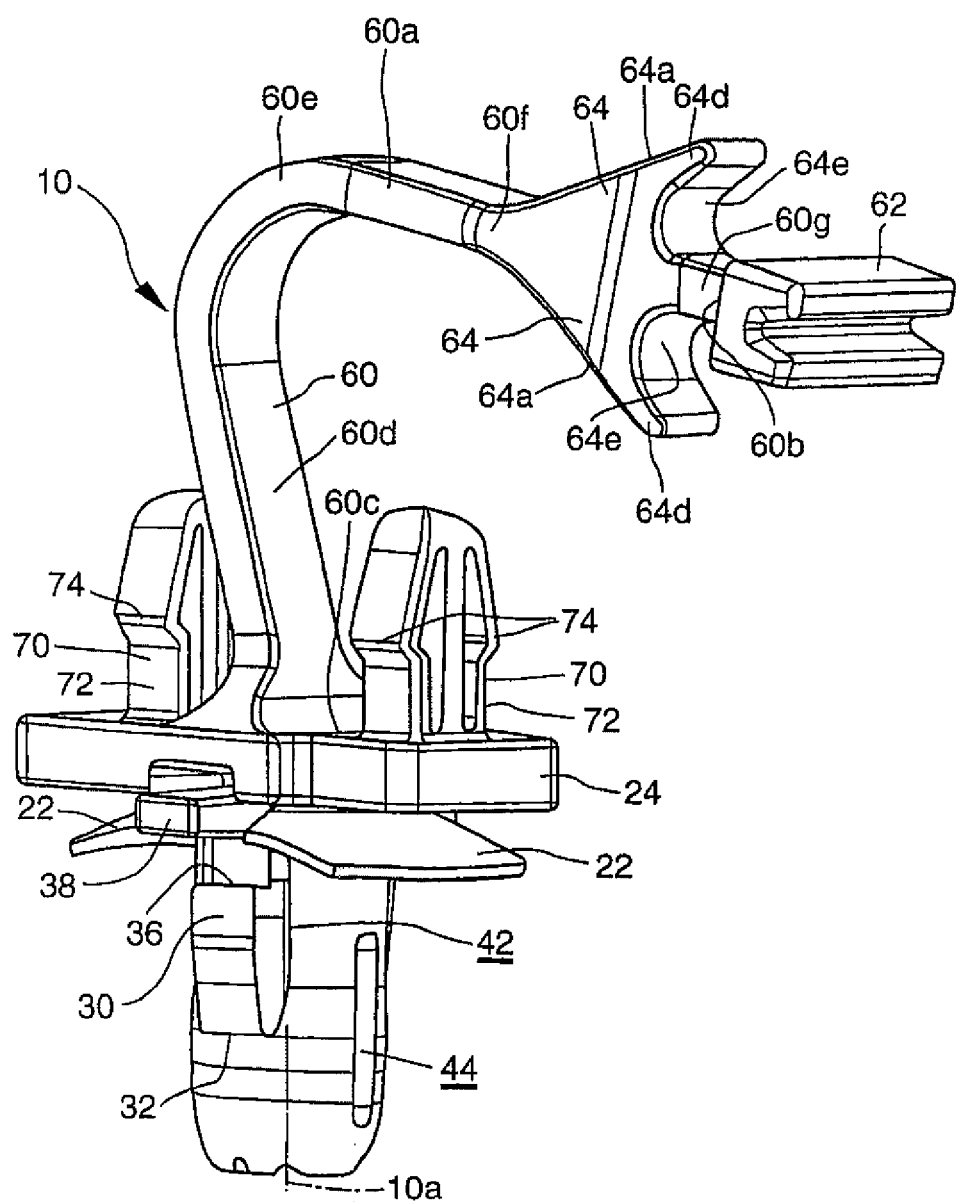
FIG. 19 is a perspective view of the tether clip of FIG. 18.
Figure 20:
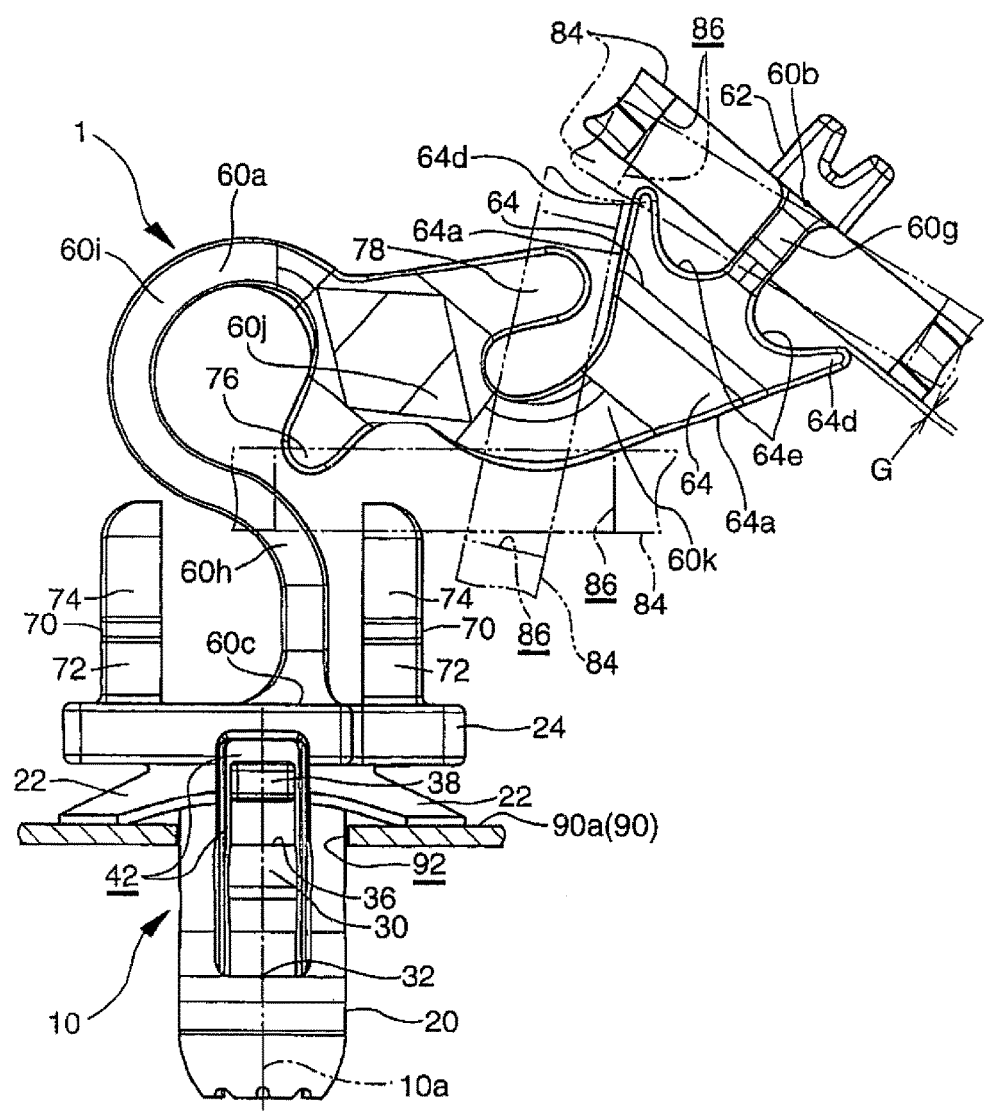
FIG. 20 is a side view of a tether clip according to a third embodiment of the present invention and a structure for coupling the tether clip according to the third embodiment to a pillar garnish.

FIGS. 1-17 correspond to the first embodiment and are applicable also to the second and third embodiments except the elastic branch. FIGS. 18, 19, 22 and 23 correspond to the second embodiment and are applicable also to the third embodiment. FIG. 20 corresponds to the third embodiment.

Portions common or similar to the first-third embodiments are denoted with the same reference numerals over the first-third embodiments.

First Embodiment

First, structures of the tether clip 10 according to the first embodiment and the structure 1 for coupling the tether clip to a pillar garnish will be explained.

Figure 1:
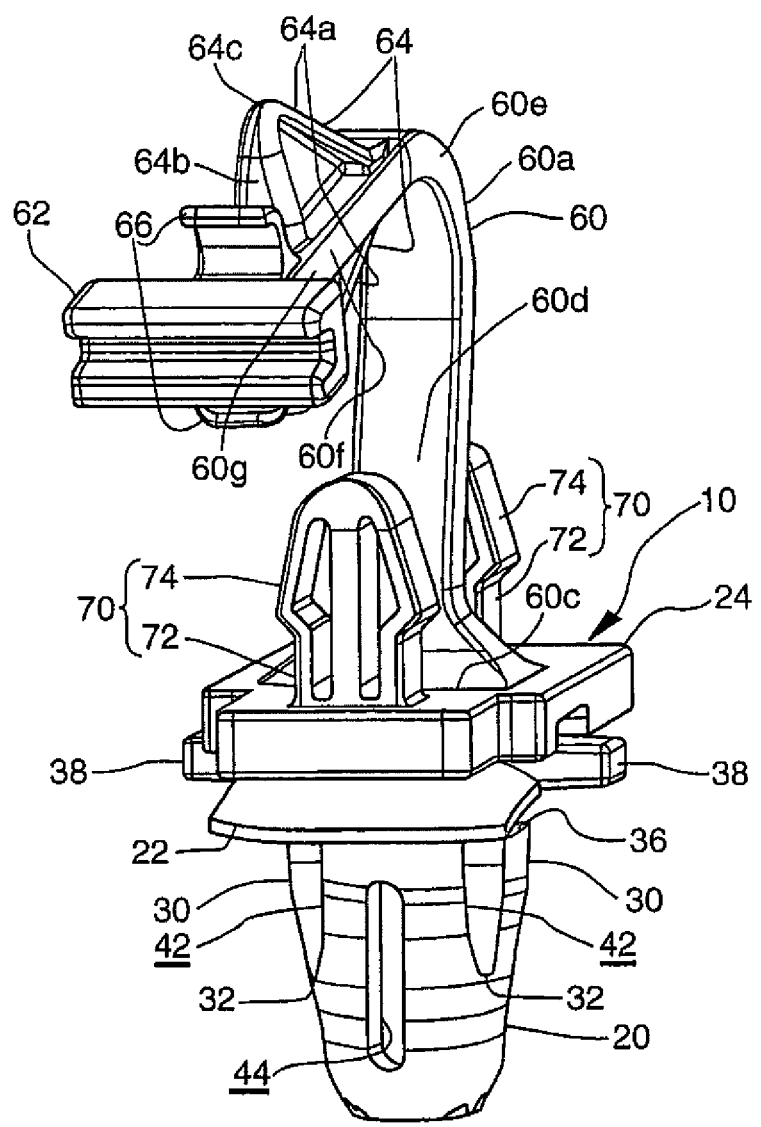
FIG. 1 is a perspective view of a tether clip according to a first embodiment of the present invention.

In the first embodiment, FIG. 1 shows the tether clip 10 only, and FIGS. 2-17 show the tether clip 10 and the structure 1 for coupling the tether clip 10 to the pillar garnish 80.

Figure 2:
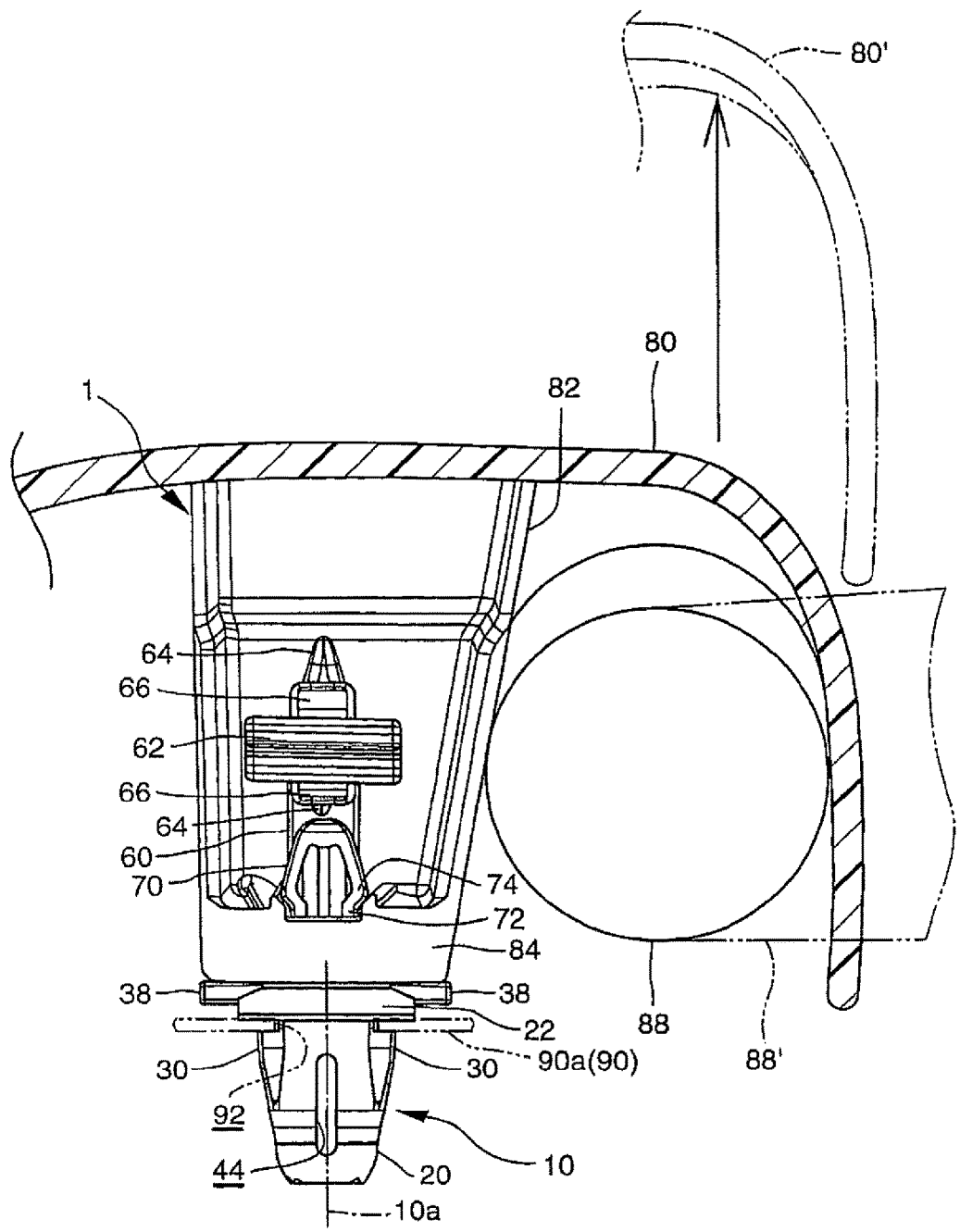
FIG. 2 is a front view of a structure for coupling the tether clip shown smaller than that in FIG. 1 to a pillar garnish viewed along a longitudinal direction of the pillar garnish.
Figure 3:
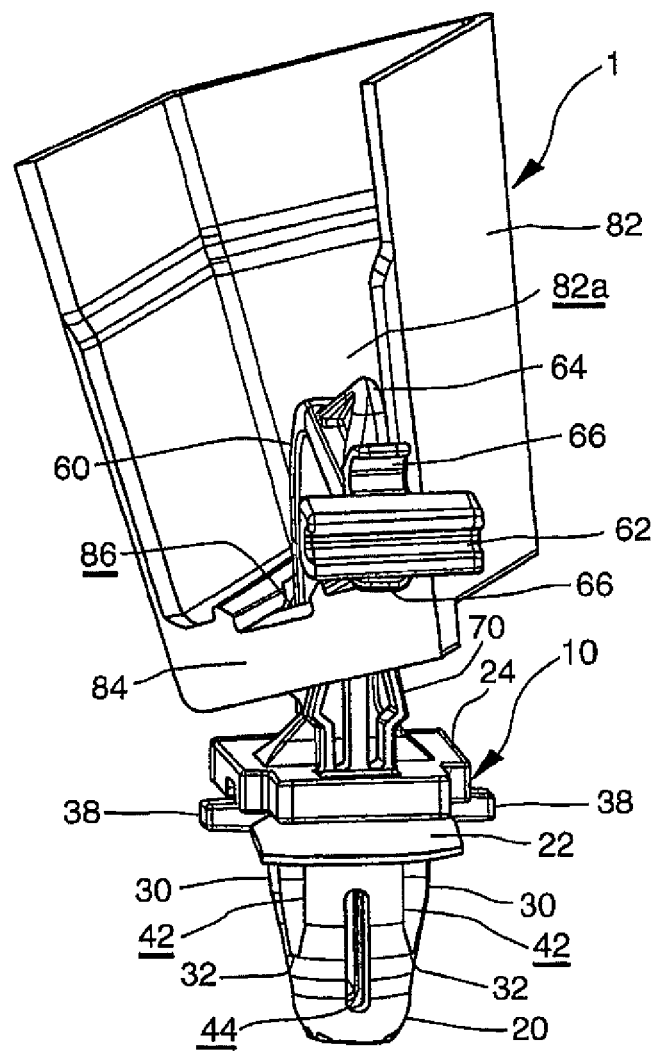
FIG. 3 is a perspective view of the structure for coupling the tether clip to the pillar garnish (hereinafter, simply "the coupling structure"), when the pillar garnish has begun being moved in a direction in which the pillar garnish is drawn out from the tether clip and before a pair of guide plates enters a tether inserting aperture.
Figure 10:
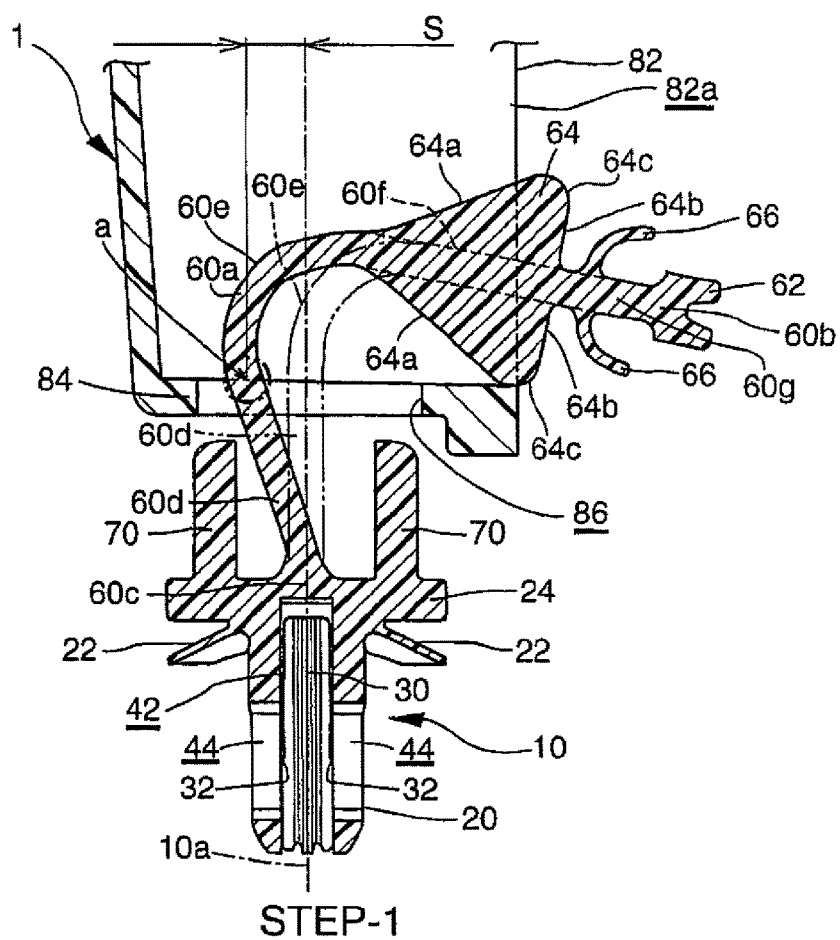
FIG. 10 is a cross-sectional view viewed in a side-view direction, of the coupling structure of FIG. 8, wherein a tether shown in a full line corresponds to one embodiment of the invention and a tether shown in a two-dotted line corresponds to one alteration of the invention.

As illustrated in FIGS. 1, 2 and 10, the tether clip 10 includes a single seat (which may be called a flange) 24 perpendicular to a center axis line 10a of the clip (shown in FIG. 10), a single leg 20 extending in a direction away from the seat 24 and along the center axis line 10a of the clip, a tether 60 extending in a direction away from the seat 24 and opposite the leg 20 and extending along one plane drawing a curved line, a straight line, or a combination of a curved line and a straight line, an anchor 62 connected to a tip 60b of the tether and extending in a direction perpendicular to the tether 60, and an engagement holding portion 70 rising from the seat 24 on the same side as the tether 60. The anchor 62 extends in a direction perpendicular to the one plane along which the tether extends. A configuration of the anchor 62 is rectangular.

As illustrated in FIGS. 2 and 10, the tether clip 10 has a tether housing portion 82 which houses at least a portion of the tether 60 therein when the clip 10 has been coupled to the pillar garnish 80. At a bottom wall 84 of the tether housing portion 82, a tether inserting aperture 86 which is rectangular is perforated. A longitudinal direction of the tether inserting aperture 86 is directed to a longitudinal direction of the pillar garnish 80. The tether housing portion 82 has an opening 82a open in one direction along the longitudinal direction of the pillar garnish 80.

The clip 11 is made from a resin having a deformability. The resin is, for example, polyhexamethylene adipamide. However, so long as the resin has a deformability and a necessary strength, a resin other than polyhexamethylene adipamide may be used. The pillar garnish 80 is made from a plastic having a hardness equal to or harder than the resin of the tether clip 10.

As illustrated in FIG. 2, the structure 1 for coupling the tether clip 10 to the pillar garnish 80 includes the tether clip 10 and the pillar garnish 80. When coupling the tether clip 10 to the pillar garnish 80, a longitudinal direction of the anchor 62 and the longitudinal direction of the tether inserting aperture 86 are made to coincide with each other. In the state, the anchor 62 is caused to pass through the tether inserting aperture 86. Then, the tether clip 10 is rotated by ninety degrees about the center axis line 10a of the clip. Then, the tether 60 is further moved into the tether housing portion 82, so that the anchor 62 comes to an outside of the tether housing portion 82 (as shown in FIG. 10) through the opening 82a of the tether housing portion 80 and the bottom wall 84 of the tether housing portion 82 is held between a bulging portion 74 of the engagement holding portion 70 and the seat 24. As a result, the tether clip 10 is coupled to the pillar garnish 80.

In a state where the tether clip 10 has been coupled to the pillar garnish 80, the tether 60 extends out from an interior to an exterior of the tether housing portion 82 through the opening 82a, and the anchor 62 is located outside the tether housing portion 82. Therefore, the tether 60 can be made long without being restricted by side walls of the tether housing portion 82.

By inserting the leg 20 of the tether clip 10 coupled to the pillar garnish 80 into a clip fixing aperture 92 of a pillar 90 (a front pillar shown in FIG. 2), the pillar garnish 80 is installed to the pillar 90. A cross section of the leg 20 is substantially circular, and the clip fixing aperture 92 is circular. Therefore, the leg 20 is rotatable in the clip fixing aperture 92 about the center axis line 10a of the clip.

An intermediate portion of tether 60 is curved. A curving direction of the tether 60 coincides with the longitudinal direction of the pillar garnish 80. At the time of deployment of a CSA 88 such as at the time of side collision or rolling over of a vehicle, the pillar garnish 80 is moved in a direction in which the pillar garnish 88 is drawn out from the tether clip 10 until the bottom wall 84 of the tether housing portion 82a is brought into contact with the anchor 62. At that time, a gap for deployment of the CSA 88 is formed between the moved pillar garnish 80' and the pillar 90, and a further movement of the pillar garnish 80 is prevented by the anchor 62 so that a free movement of the pillar garnish 80 is restricted.

The CSA 88 is housed in a space formed between the pillar 90 and the pillar garnish 80 in a folded state. At the time of collision or rolling over of a vehicle, the CSA 88 is deployed and expanded to push the pillar garnish 80 in a direction away from the pillar 90 (i.e., in a direction shown by an arrow in FIG. 2). The CSA 88 is deployed through the gap formed between an inner panel 90a of the pillar and the pillar garnish 80 into a passenger compartment to a space existing between a passenger and a side door of the vehicle to thereby restrict and protect a head of the passenger. In FIG. 2, reference numeral "88" shows one portion of the deploying CSA.

Since the intermediate portion of the tether 60 is curved, the tether 60 extends from the interior to the exterior of the tether housing portion 82 through the opening 82a, and the anchor 62 is located outside the tether housing portion 82, a length of the tether can be large. As a result, the gap formed between inner panel 90a and the pillar garnish 80 at the time of deployment of the CSA can be large.

Each portion of the tether clip 10 and the structure 1 for coupling the tether clip 10 to the pillar garnish 80 will be explained in order and in more detail below.

The leg 20 is perpendicular to the seat 24. A center axis line of the leg coincides with the center axis line 10a of the clip (shown in FIG. 10). The leg 20 is hollow. The cross-sectional shape of the leg 20 in the direction perpendicular to the center axis line 10a of the clip is circular or substantially circular.

A pair of openings (defined by a slit 42) is faulted at a pair of portions of the hollow leg 20 located on opposite sides of the center axis line 10a of the clip and opposing each other. A pair of engagement hooks 30 is provided at the pair of openings. The engagement hooks 30 oppose each other in the direction perpendicular to the center axis line 10a of the clip.

Each engagement hook of the pair of engagement hooks 30 extends from a hook connecting portion 32 (i.e., a connecting portion of the hook with the leg 20) spaced from the seat 24 in an axial direction of the clip toward the seat 24. The engagement hook 30 may end in the form of a free end. In a case where the engagement hook 30 ends in the form of a free end, the engagement hook 30 is separated from the leg 20 and the seat 24 by a slit 42 formed in the forth of an inverted "U" letter except the hook connecting portion 32. There may be a plurality of pairs of engagement hooks 30. In the embodiment, one pair of engagement hooks 30 is provided.

An axial end of the slit 42 on a side further from the seat 24 and the hook connecting portion 32 may coincide in position with each other in the axial direction of the leg 20. Since the tether clip 10 is made from the resin having a deformability, the engagement hook 30 is elastically deformable so as to rotate in directions away from and toward the center axis line 10a of the clip, i.e., in directions to fall and to extend.

The engagement hook 30 has an inclined outside surface and a body engaging surface 36. The outside surface of the engagement hook 30 is inclined relative to an outside surface of the leg such that a distance between the outside surface of the engagement hook and the center axis line 10a of the clip is increased from the hook connecting portion toward the seat 24. The body engagement surface 36 is bent from the inclined outside surface of the engagement hook at a seat-side end of the inclined outside surface to extend toward the center axis line 10a of the clip and opposes the seat 24.

When the tether clip 10 coupled to the pillar garnish 80 is installed to the pillar 90, the leg 20 is inserted into the clip fixing aperture 92. First, the outside surface of the engagement hook 30 is brought into contact with an inside surface or an inside corner of a rim portion of the tether housing portion defining the clip fixing aperture 92. When the tether clip 10 is more inserted into the clip fixing aperture 92, the seat-side end of the engagement hook 30 is rotated in the direction in which the engagement hook 30 approaches the center axis line 10a of the clip, about a rotational deformation center located in the vicinity of the hook connecting portion 32 or a hypothetical rotational deformation center located further from the seat 24 than the rotational deformation center.

A deformation promoting portion 44 may be provided at each of leg portions located in a diametrical direction perpendicular to an opposing direction of the pair of engagement hooks 30. The deformation promoting portion 44 may be one of an elongated hole elongated in the axial direction of the leg, an axially extending slit formed at the leg and released to an outside at a lower end of the leg, and a thickness-reduced portion formed at the leg and extending in the axial direction of the leg. However, the deformation promoting portion 44 is not necessarily required to be provided. In a case where the deformation promoting portion 44 is provided, the hook connecting portion 32 and a hook root portion connected to the hook connecting portion 32 can be deformed toward the center axis line 10a of the clip due to the deformation promoting portion 44, when pushed by the rim portion of the tether housing portion defining the clip fixing aperture 92. As a result, the hook connecting portion 32 and the hook root portion can pass through the clip fixing aperture 92 even if a radius of the outside surface of the hook connecting portion 32 and a radius of the outside surface of the hook root portion are larger than a radius of the clip fixing aperture 92. Therefore, while maintaining passability of the hook connecting portion 32 and the hook root portion through the clip fixing aperture 92, the thicknesses of the hook connecting portion 32 and the hook root portion can be made large, whereby rigidities of the hook connecting portion 32 and the hook root portion can be increased.

A convexity-concavity is formed at an inside surface of the hollow leg 20 from the seat-side end of the pair of engagement hooks 30 to the lower end of the leg 20. The convexity-concavity extends straight and parallel to the center axis line 10a of the clip. A convexity formed at one engagement hook of the pair of engagement hooks 30 and a concavity formed at the other engagement hook of the pair of engagement hooks 30 oppose each other in the opposing direction of the pair of engagement hooks 30. As a result, when the engagement hooks 30 are deformed to approach each other, the engagement hooks 30 are prevented from interfering with each other, so that falling angles of the engagement hooks 30 are increased.

The tether clip 10 may further include a spring spacer 22. The spring spacer 22 may be connected to the seat 24 or the seat-side end of the leg 20 and extends in a direction away from the seat 24 and away from the center axis line 10a of the clip. The spring spacer 22 has an elasticity. When the leg 20 is inserted into the clip fixing aperture 92 of the pillar 90, the spring seat 24 is brought into contact with the rim portion of the tether housing portion defining the clip fixing aperture 92 and is compressed. The spring spacer 22 and the body engaging surface 36 of the engagement hook hold the rim portion of the tether housing portion defining the clip fixing aperture 92 therebetween. The spring spacer 22 absorbs a clearance existing between the tether clip 10 and the pillar 90 to thereby suppress tilting of the tether clip 10 relative to the pillar. The spring spacer 22 may be formed integrally with the tether clip 10 as shown in the drawings or may be formed separately from the tether clip 10 though not shown.

The tether clip 10 may be a clip of such a type as has an engagement releasing portion 38 which is connected to a seat-side end of a seat-side extension of each engagement hook 30 and extends away from the center axis line 10a of the clip. When the tether clip 10 is removed from the pillar 90 at a time of a service, etc., a pair of engagement releasing portions 38 is pinched by fingers. The engagement releasing portions 38 are pushed to approach each other so that the engagement hooks 30 are rotated about respective rotational deformation centers of the engagement hooks 30 to approach each other. When the body engaging surfaces 36 of the engagement hooks 30 disengage from the pillar 90, by pulling the tether clip 10 in a removal direction, the tether clip 10 can be drawn out from the pillar 90.

An engagement holding portion 70 rises from the seat 24 in a direction opposite the leg 20. In the side view shown in FIG. 10, a pair of engagement holding portions 70 is provided beside a rising portion 60a of the tether 60. In a plane along which the tether 60 is curved, each engagement holding portion of the pair of engagement holding portions 70 is located on each side of the rising portion 60a of the tether such that the rising portion 60a is placed between the engagement holding portions 70. Each of the engagement holding portions 70 is spaced from the rising portion 60a of the tether.

As illustrated in FIG. 2, each engagement holding portion of the pair of engagement holding portions 70 includes a rising portion 72 and a bulging portion 74. The rising portion 72 rises from the seat 24 by an amount substantially equal to a thickness of the bottom wall 84 of the tether housing portion where the tether inserting aperture 86 is formed. The bulging portion 74 further extends in the direction away from the seat 24 from a tip of the rising portion 72 and bulges in a direction perpendicular to the extending direction of the rising portion 72. The bulging portion 74 is hollow and has an elasticity in the direction perpendicular to the extending direction of the rising portion 72. In a free state of the engagement holding portions 70, a distance between outside surfaces of the bulging portion 74 is larger than a length of a short side of the rectangular tether inserting aperture 86 formed at the tether housing portion 82.

When coupling the tether clip 10 to the pillar garnish 80, the engagement holding portion 70 is pushed into the tether inserting aperture 86 of the tether housing portion 82. At that time, the bulging portion 74 is elastically deformed in a direction where a bulging amount is decreased, so that the bulging portion 74 can pass through the tether inserting aperture 86 and enters the tether housing portion 82. When the bulging portion 74 has passed through the tether inserting aperture 86, the bulging portion 74 elastically returns to its original position (in its free state). Thus, the bulging portion 74 engages the rim portion of the tether housing portion 82 defining the tether inserting aperture 86 at a long side of the aperture, so that the tether clip 10 holds the bottom wall 84 of the tether housing portion 82 between the bulging portion 74 and the seat 24. While maintaining this state, the tether clip 10 is installed to the pillar 90.

At the time of deployment of the CSA 88, when the pillar garnish 80 is pushed by the CSA 88 in the direction away from the pillar 90 (in the direction denoted with an arrow in FIG. 2), the rim portion of the tether housing portion 82 defining the tether inserting aperture 86 pushes the bulging portion 74 of the engagement holding portion 70 in the removal direction and elastically deforms the bulging portion 74 in the direction where the bulging amount is decreased. Then, the bulging portion 74 can pass through the tether inserting aperture 86, and the bottom wall 84 of the tether housing portion 82 disengages the bulging portion 74.

Figure 17:
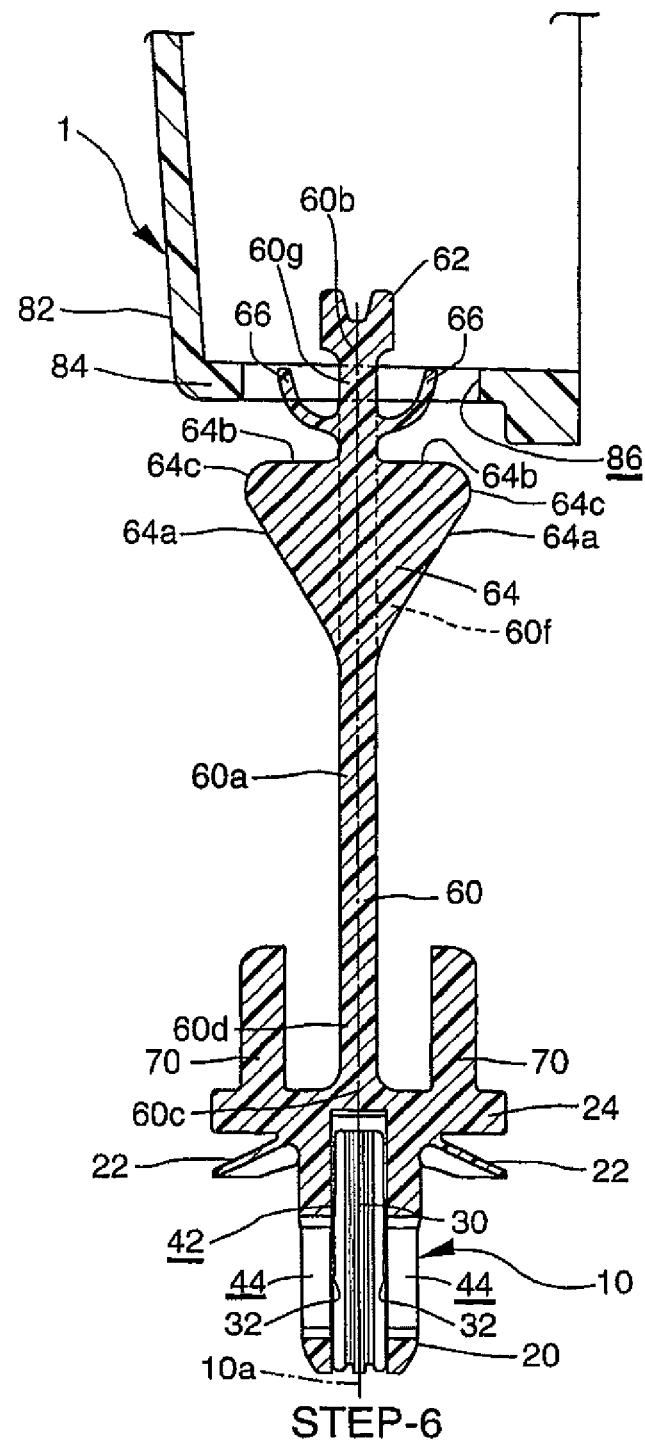
FIG. 17 is a cross-sectional view viewed in the side-view direction, of the coupling structure of FIG. 16.

As a result, until the anchor 62 is brought into contact with the rim portion of the bottom wall 84 of the tether housing portion defining the tether inserting aperture 86, the pillar garnish 80 is moved in the direction away from the pillar 90 whereby a gap for deployment and expansion of the CSA 88 is formed between the pillar garnish 80 and the pillar 90. As illustrated in FIG. 17, when the anchor 62 is brought into contact with the rim portion of the bottom wall 84 of the tether housing portion defining the tether inserting aperture 86, the pillar garnish 80 cannot move more in the direction away from the pillar 90, whereby the pillar garnish 80 is prevented from being freely moved into the passenger compartment.

The tether 60 extends along the one plane. The tether 60 includes a tip 60b of the tether, a seat-side end 60c of the tether, a tether intermediate portion 60a extending between the tip 60b of the tether and the seat-side end 60c of the tether.

As illustrated in FIG. 10. The tether intermediate portion 60a may include a rising portion 60d rising from the seat 24, a curved portion 60e connected to the rising portion 60d and curved toward the tip 60b of the tether, and a tether portion 60f located between the curved portion 60e and the tip 60b of the tether. The rising portion 60d may be inclined in a direction away from the tip 60b of the tether relative to a direction perpendicular to the seat 24 as shown by a solid line in FIG. 10, or may be perpendicular to the seat 24 as shown by a two-dotted line in FIG. 10. The case where the rising portion 60d rises inclined to the seat 24 corresponds to the first embodiment, and the case where the rising portion 60d rises perpendicular to the seat 24 corresponds to an alteration of the first embodiment. The alteration is included in the first embodiment.

A pair of guide plates 64 is provided at the tether intermediate portion 60a. The pair of guide plates 64 extends along one plane. The one plane along which the pair of guide plates 64 extends is the same as or parallel to that one plane along which the tether 60 extends. The one plane along which the pair of guide plates 64 extends is perpendicular to a plane including a longitudinal direction of the anchor 62. The pair of guide plates 64 has two sides 64a which are located on opposite sides of the tether portion 60f located between the curved portion 60e and the tip 60b of the tether and which oppose each other. Each of the two sides 64a extends straight. A distance between points located on the two sides 64a becomes large, as the points located on the two sides 64a approach the tip 60b of the tether. The pair of guide plates 64 is integral with the tether portion 60f located between the curved portion 60e and the tip 60b of the tether.

Each of guide plate portions located between the tether portion 60f and the two sides 64a may be formed to be a solid plate as shown in the drawings or a plate having an aperture therein though not shown in the drawings. Each of the guide plate portions located between the tether portion 60f and the two sides 64a may be formed to be a plate having an open space released toward the anchor 62. In the case where each of the guide plate portions is formed solid, each of the guide plates 64 has a shape of a plate. In the case where each of the guide plate portions is formed hollow, each of the guide plates 64 has a shape of a frame defining an aperture therein. In the case where each of the guide plate portions is formed to have an open space, the guide plates 64 have a shape of a pair of rods each obliquely extending toward the anchor 62.

In the case where the pair of guide plates 64 has the shape of a plate or a frame, the pair of guide plates 64 may further have bottom sides 64b extending perpendicular to or substantially perpendicular to the tether portion 60f located between the curved portion 60e and the tip 60b of the tether, and curved portions 64c connecting the bottom sides 64b and the two sides 64a. In the case where the bottom sides 64b are perpendicular to the tether portion 60f, each of the two sides 64a including its extension and each of the two bottom sides 64f including its extension cooperate with the tether portion 60f to form a triangle. Each of the two bottom sides 64b may extend obliquely relative to the tether portion 60f of the tether intermediate portion 60a. In the case where each bottom side 64b extends obliquely relative to the tether portion 60f, the pair of guide plates 64 may have a shape having four sides. As illustrated in FIGS. 18 and 19, each of the bottom sides 64b of the pair of guide plates 64 may have a protrusion 64d protruding toward the anchor 62, or a concavity 64e concave and receding in a direction away from the anchor 62, or both of the protrusion 64d and the concavity 64e.

In the structure 1 for coupling the tether clip to the pillar garnish, it is desirable that the rectangular tether inserting aperture 86 and the rectangular anchor 62 have dimensional relationships described below. More particularly, a long side of the tether inserting aperture 86 is longer than a long side of the anchor 62. A short side of the tether inserting aperture 86 is shorter than a long side of the anchor 62 and longer than a short side of the anchor 62. As a result, when a longitudinal direction of the anchor 62 and a longitudinal direction of the tether inserting aperture 86 coincide with each other in phase, the anchor 62 can pass through the tether inserting aperture 86. When the longitudinal direction of the anchor 62 and the longitudinal direction of the tether inserting aperture 86 cross each other at an angle of ninety degrees or nearly ninety degrees, the anchor 62 cannot pass through the tether inserting aperture 86.

At the time of coupling the tether clip 10 to the pillar garnish 80, after the anchor 62 and the tether inserting aperture 86 have been made coincident in phase with each other, the anchor 62 is caused to pass through the tether inserting aperture 86. When the anchor 62 has passed through the tether inserting aperture 86, the tether clip 10 is rotated about the center axis line 10a of the clip by ninety degrees so that the anchor 62 does not pass through the tether inserting aperture 86. As a result, the tether clip 10 is coupled to the pillar garnish 80. Then, the leg 20 of the tether clip 10 is pushed into the clip fixing aperture 92 of the pillar 90 so that the pillar garnish 80 is installed to the pillar 90. At the time of deployment of the CSA 88, when the pillar garnish 80 is moved in the removal direction from the tether clip 10 (in the same direction as the direction away from the pillar 90), the pillar garnish 80 can move until the anchor 62 is brought into contact with the rim portion of the bottom wall 84 of the tether housing portion defining the tether inserting aperture 86, so that a gap for deployment of the CSA is formed between the pillar garnish 80 and the pillar 90. Upon contacting the rim portion of the tether housing portion defining the tether inserting aperture 86, the anchor 62 restricts a further movement of the pillar garnish 80, so that the pillar garnish 80 is prevented from being freely moved into the passenger compartment.

In the structure 1 for coupling the tether clip to the pillar garnish, there are structural relationships described below between the tether inserting aperture 86 and the guide plate 64. More particularly, the long side of the tether inserting aperture 86 is longer than a maximum distance between the opposing two sides 64a of the pair of guide plates 64. Therefore, when the anchor 62 has passed through the tether inserting aperture 86 and then the tether clip 10 is rotated about the center axis line 10a of the clip by ninety degrees whereby a plane including the pair of guide plates 64 and the longitudinal direction of the tether inserting aperture 86 are made coincident with each other, the pair of guide plates 64 can pass through the tether inserting aperture 86. In this state, by inserting the tether 60 more deeply into the tether housing portion 82, coupling the tether clip 10 to the pillar garnish 80 can be completed. In a state where the tether clip 10 has been completely coupled to the pillar garnish 80, it is desirable for at least the two sides 64a of the pair of guide plates 64 to be located within the tether housing portion 82. The curved portions 64c and the bottom sides 64b of the pair of guide plates 64 may be located outside the tether housing portion 82. This state is maintained, when the tether clip 10 has been coupled to the pillar garnish 80.

Figure 8:
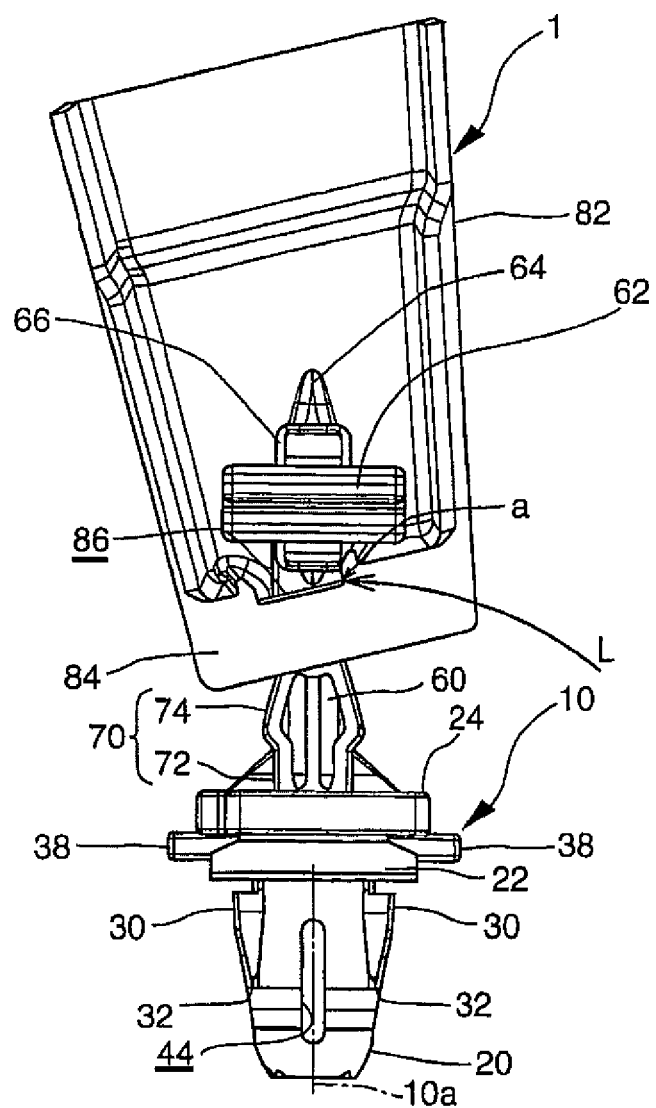
FIG. 8 is a front view of the coupling structure at a step 1 (STEP-1, hereinafter) corresponding to a time when the pillar garnish has begun to be moved in the direction in which the pillar garnish is drawn out from the tether clip and before the pair of guide plates enters the tether inserting aperture.
Figure 11:
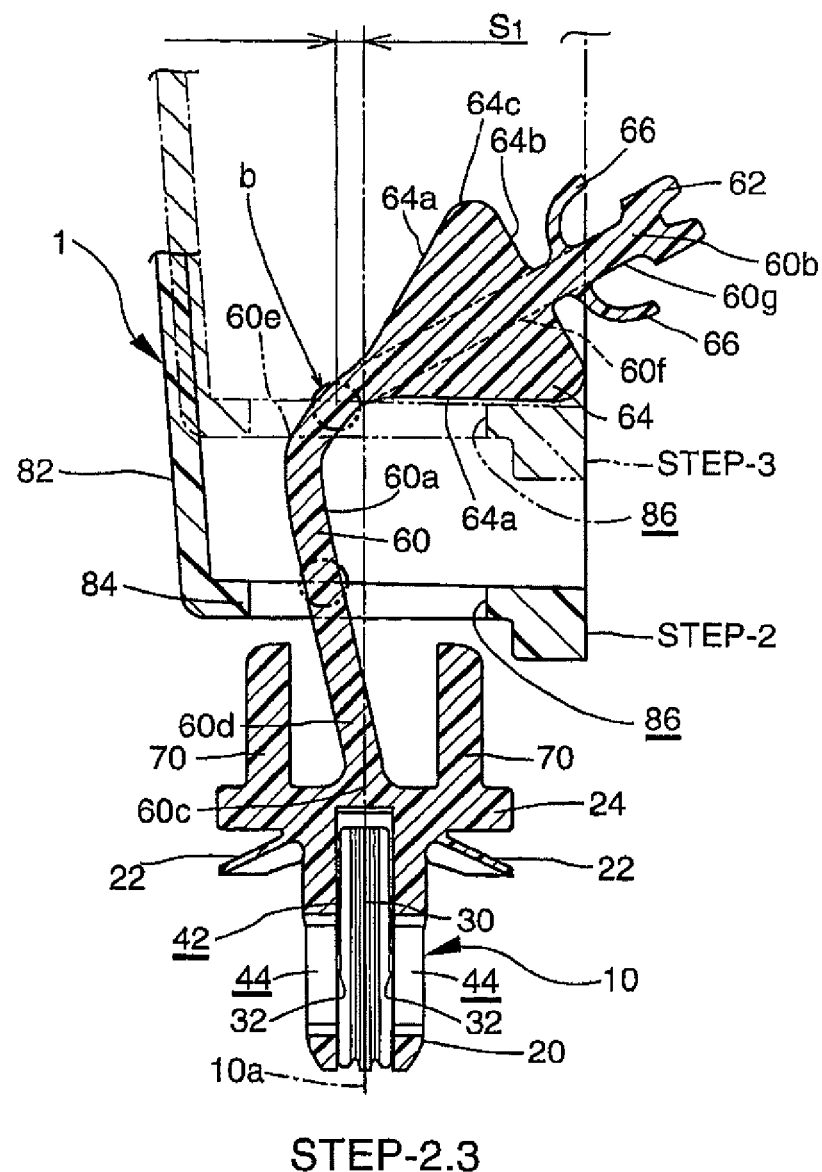
FIG. 11 is a cross-sectional view viewed in the side-view direction, of the coupling structure at STEP-2 or STEP-3 corresponding to a time when the pillar garnish has been further moved in the direction in which the pillar garnish is drawn out from the tether clip than the state shown in FIG. 10 and before the pair of guide plates enters the tether inserting aperture.

As illustrated in FIG. 8, at the time of deployment of the CSA 88, when the pillar garnish 80 receives a load from the CSA 88, the pillar garnish 80 is moved in the direction away from the pillar being inclined such that one portion of the pillar garnish located on a CSA-side is open more than the other portion of the pillar garnish located on an opposite CSA-side. At that time, since the tether 60 is curved along the one plane, the tether clip 10 is rotated about the center axis line 10a of the clip. More particularly, in the case where the rising portion 60d is inclined on a side further from the anchor 62 than the center axis line 10a of the clip, at STEP-1 shown in FIGS. 9 and 10, the rim portion of the tether housing portion defining the tether inserting aperture 86 contacts the rising portion 60d at point "a" spaced by an amount "S" (see FIG. 10) from the center axis line 10a of the clip on a side opposite the anchor 62. Therefore, in FIG. 9, the tether 60 is rotated in a left direction (i.e., a counterclockwise direction) "L" about the center axis line 10a of the clip. At STEPS 2 and 3 where the pillar garnish 80 has been moved more than step 1 in the removal direction from the tether clip 10, as illustrated in FIG. 11, point "b" spaced by an amount "S₁" from the center axis line 10a of the clip is located still on the side opposite the anchor 62. Therefore, a rotational direction of the tether 60 relative to the center axis line 10a of the clip is maintained at the left direction (the counterclockwise direction) "L".

The short side of the tether inserting aperture 86 is shorter than the maximum distance between the opposing two sides 64a of the pair of guide plates 64. Due to the structure, at the time of deployment of the CSA, when the pillar garnish 80 is moved in the direction away from the pillar 90, the pair of guide plates 64 enters the tether inserting aperture 86 from the interior of the tether housing portion 82. At that time, if the tether clip 10 is rotated about the center axis line 10a of the clip, at STEP-4 shown in FIGS. 12 and 13, the opposing two sides 64a of the pair of guide plates 64 are brought into contact with the bottom wall portions located at the long sides of the tether inserting aperture 86, so that a further rotation of the tether clip 10 about the center axis line 10a of the clip is restricted. At that time, the contact points "c" of the two sides 64a with the rim portion of the bottom wall of the tether housing portion defining the tether inserting aperture 86 are located on a side closer to the anchor 62 than the center axis line 10a of the clip. Therefore, the tether 60 is rotated in a right direction (i.e., a clockwise direction) "R" about the center axis line 10a of the clip.

Figure 4:
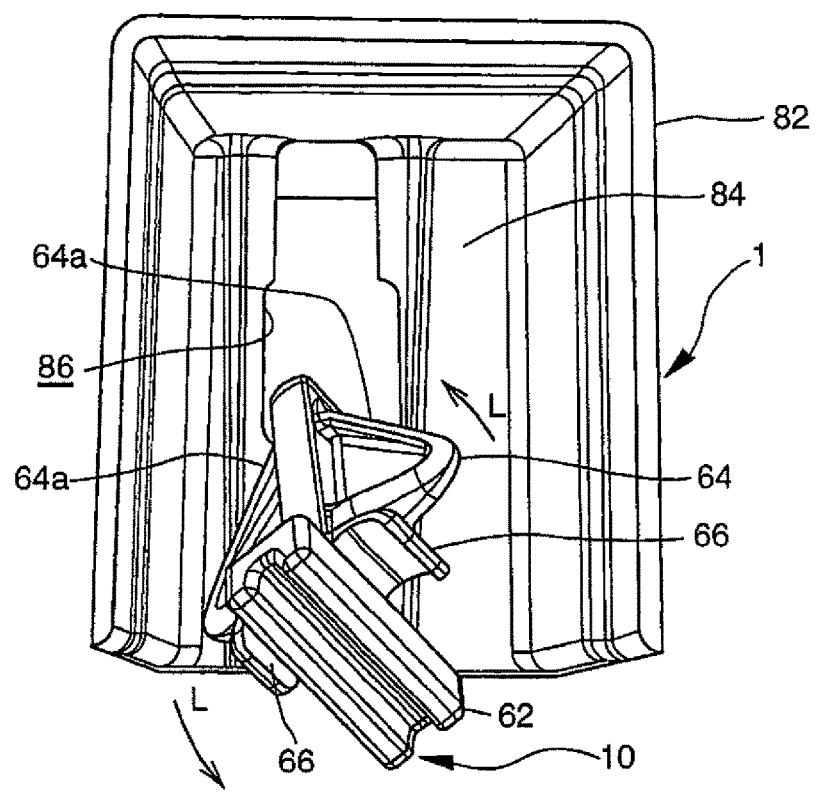
FIG. 4 is a plan view of the coupling structure when the pillar garnish has been further moved in a direction in which the pillar garnish is drawn out from the tether clip than the state shown in FIG. 3 and the pair of guide plates is in a sliding contact with a rim portion of the tether housing portion defining the tether inserting aperture whereby a moment for returning a rotational amount of the tether to zero degree is acting on the tether.
Figure 5:
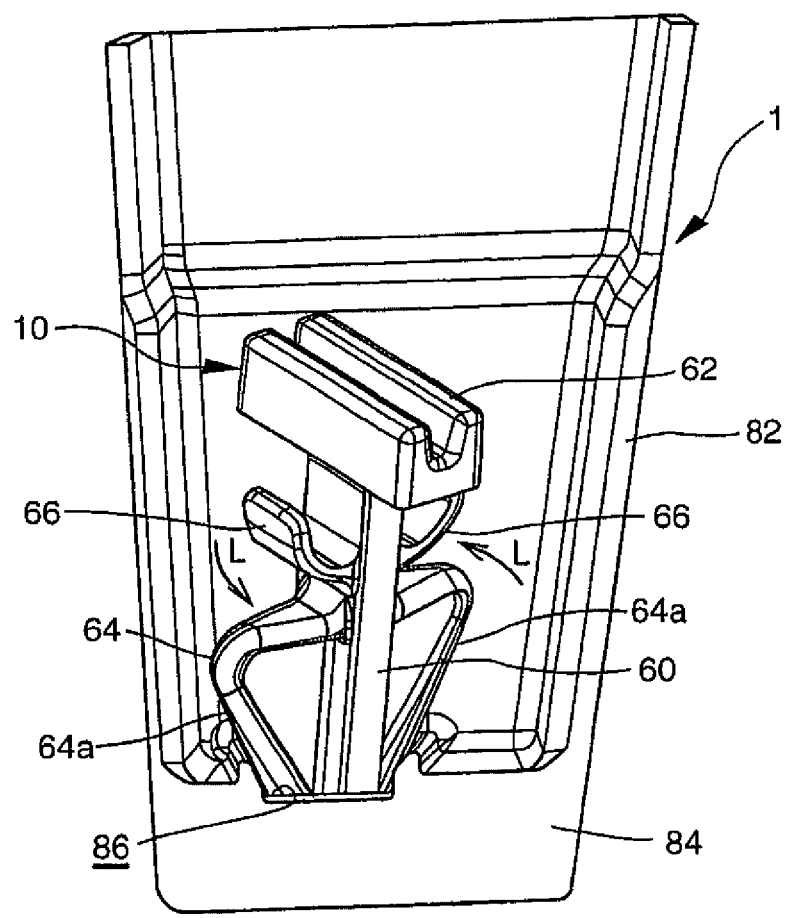
FIG. 5 is a front view of the coupling structure of FIG. 4.
Figure 6:
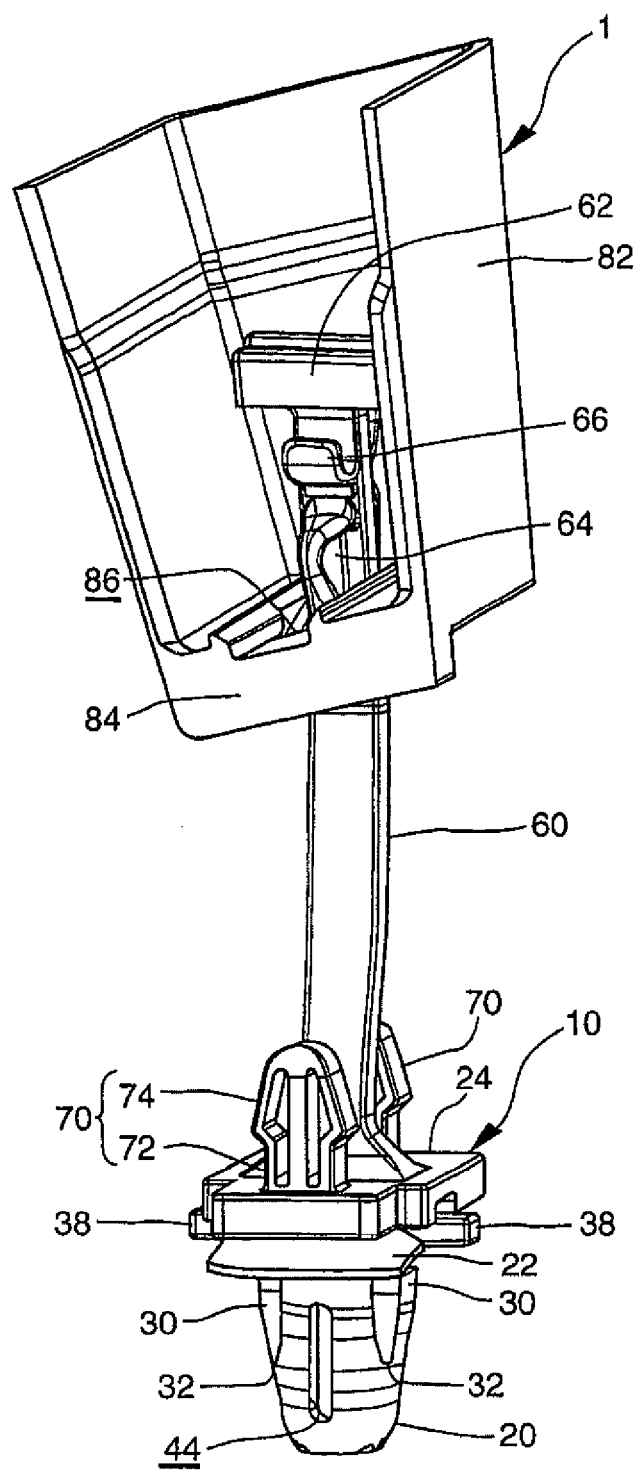
FIG. 6 is a perspective view of the coupling structure when the pillar garnish has been further moved in the direction in which the pillar garnish is drawn out from the tether clip than the state shown in FIG. 4 and the pair of guide plates has entered the tether inserting aperture whereby the rotational amount of the tether has been returned to zero degree.
Figure 7:
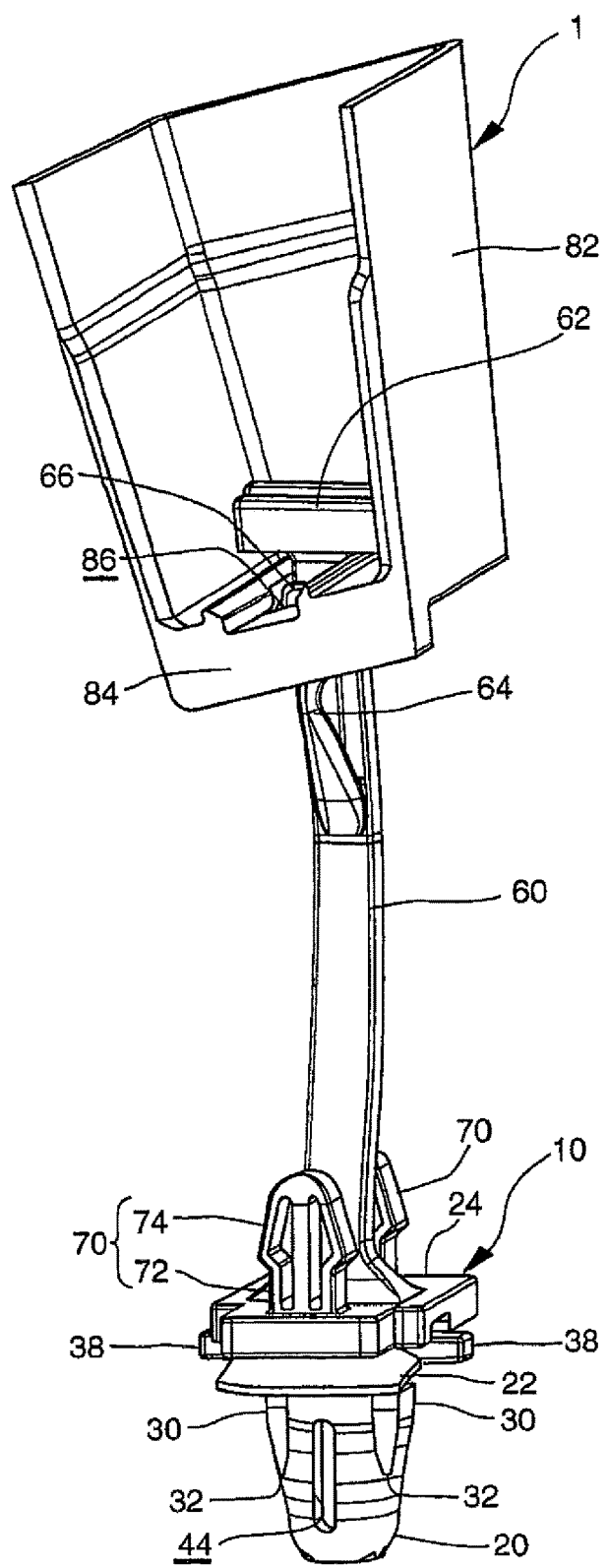
FIG. 7 is a perspective view of the coupling structure when the pillar garnish has been further moved in the direction in which the pillar garnish is drawn out from the tether clip than the state shown in FIG. 6, the anchor has contacted the rim portion of the tether housing portion, and the elastic branch has entered the tether inserting aperture.

When the pillar garnish 80 is further moved in the direction away from the pillar 90, an entering amount of the pair of guide plates 64 into the tether inserting aperture 86 is increased, and accompanying the increase in the entering amount, the distance between the contact points "c" of the two sides 64*a* is likely to be increased. However, since the distance between the contact points "c" of the two sides 64*a* is restricted to a distance between the long sides of the tether inserting aperture 86, at STEP-5 shown in FIGS. 14 and 15, the rotational amount of the tether 60 in the right direction (i.e., the clockwise direction) "R" about the center axis line 10*a* of the clip is controlled to become a nearly zero degree. Thus, the rotational angle of the tether clip 10 about the center axis line 10*a* of the clip can be returned to the nearly zero degree. FIGS. 4 and 5 show states where the rotational angle of the tether clip 10 about the center axis line 10*a* of the clip is being returned to the nearly zero degree.

Next, technical advantages of the tether clip 10 and the structure 1 for coupling the tether clip to the pillar garnish, especially technical advantages of the pair of guide plates 64, according to the first embodiment will be explained.

Figure 9:
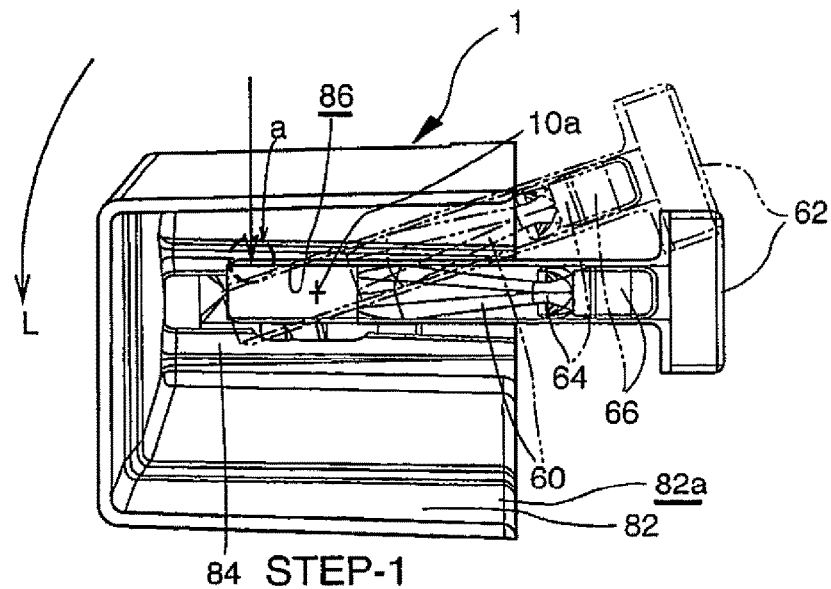
FIG. 9 is a perspective view viewed in a plan-view direction, of the coupling structure of FIG. 8.
Figure 12:
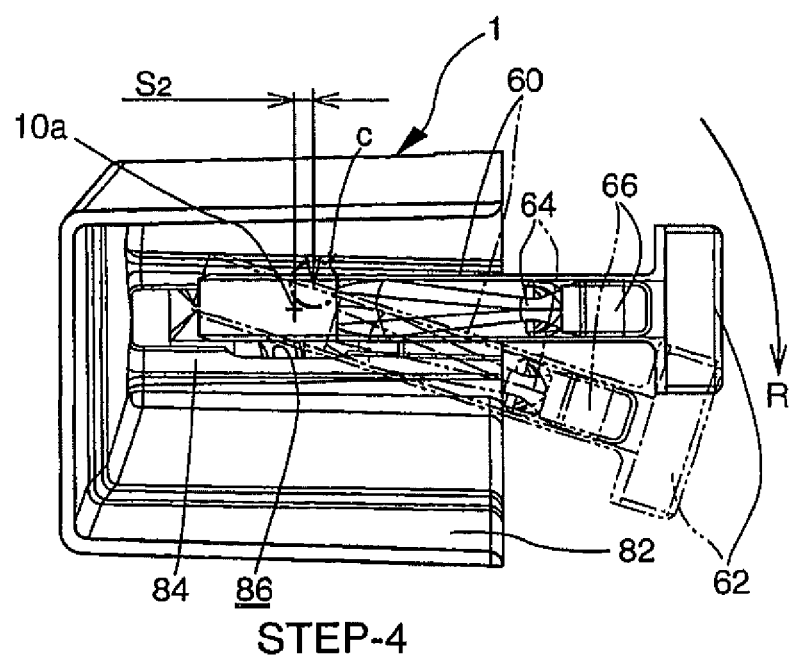
FIG. 12 is a cross-sectional view in the plan-view direction, of the coupling structure at STEP-4 corresponding to a time when the pillar garnish has been further moved in the direction in which the pillar garnish is drawn out from the tether clip than the state shown in FIG. 11 and when a portion of the pair of guide plates has entered the tether inserting aperture.

When the pillar garnish 80 is moved in the removal direction from the tether clip 10, the tether 60 is pushed by the pillar garnish so that in some cases the tether clip 10 is rotated about the center axis line 10*a* of the clip. More particularly, in a case where the tether intermediate portion 60*a* has a portion offset from the center axis line 10*a* of the clip, when the tether clip 10 is pushed by the rim portion of the tether housing portion defining the tether inserting aperture 86, the tether clip 10 may be rotated in the left direction (i.e., counterclockwise direction) "L" as shown in FIGS. 8 and 9, or in the right direction (i.e., the clockwise direction) "R" as shown in FIGS. 12 and 13.

Figure 13:
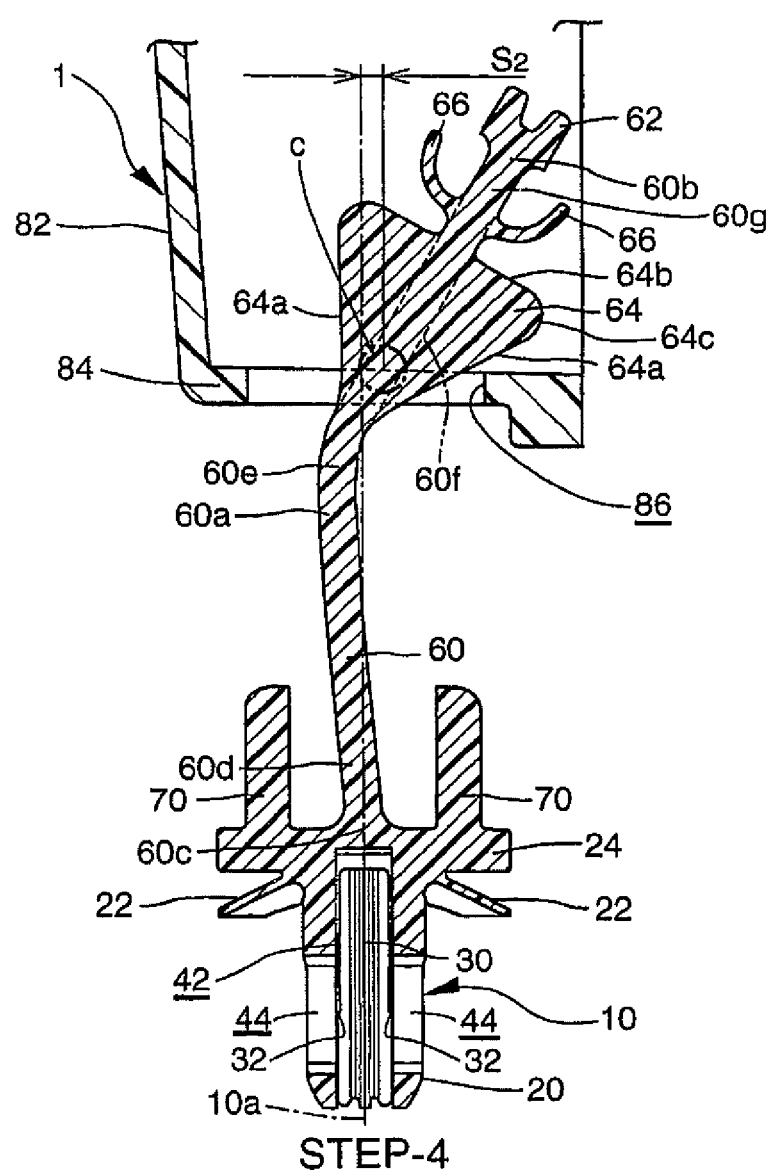
FIG. 13 is a cross-sectional view viewed in the side-view direction, of the coupling structure of FIG. 11.
Figure 14:
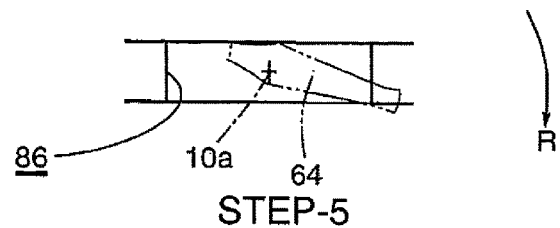
FIG. 14 is a front view of a portion of the coupling structure at STEP-5 corresponding to a time when the pillar garnish has been further moved in the direction in which the pillar garnish is drawn out from the tether clip than the state shown in FIG. 13 and the pair of guide plates has entered the tether inserting aperture whereby the rotational angle of the tether has been returned to a nearly zero degree.
Figure 15:
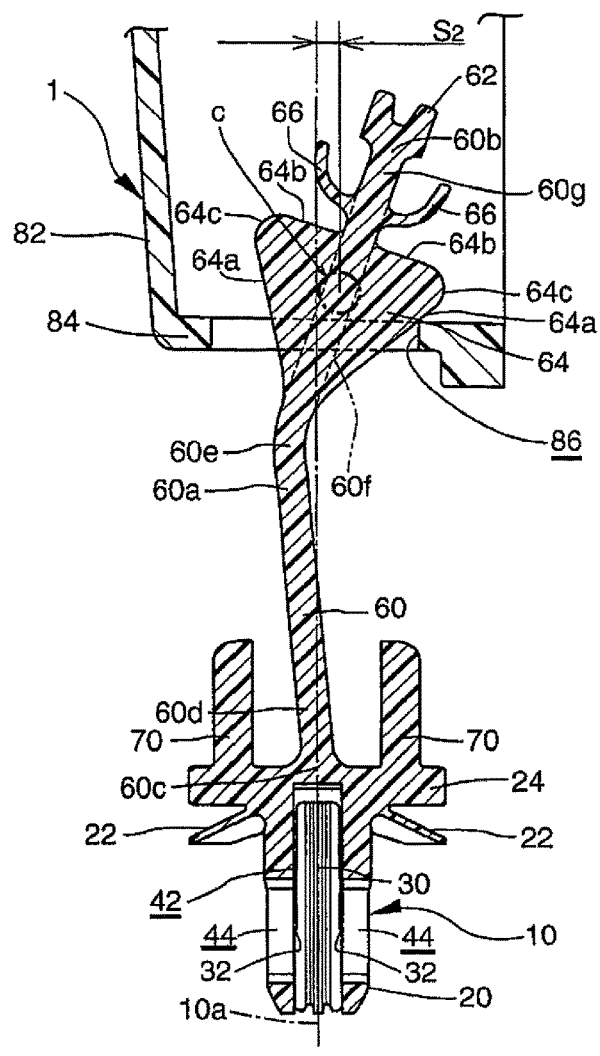
FIG. 15 is a cross-sectional view viewed in the side-view direction, of the coupling structure of FIG. 14.
Figure 16:
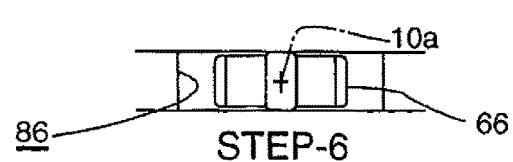
FIG. 16 is a plan view of a portion of the coupling structure at STEP-6 corresponding to a time when the pillar garnish has been further moved in the direction in which the pillar garnish is drawn out from the tether clip than the state shown in FIG. 15 and a portion of the elastic branch has entered the tether inserting aperture.

However, since the pair of guide plates 64 is provided at the tether 60, when the pair of guide plates 64 comes to the tether inserting aperture 86, the two sides 64*a* of the pair of guide plates 64 are brought into contact with the rim portion of the tether housing portion defining the tether inserting aperture 86 as shown in FIGS. 4, 5 and 13, before the tether 60 is rotated by nearly ninety degrees about the center axis line 10*a* of the clip. Due to the contact, the tether 60 is prevented from being further rotated about the center axis line 10*a* of the clip.

When the pillar garnish 80 is further moved in the removal direction than the position where rotation of the tether is stopped, the points on the two sides 64*a* of the pair of guide plates 64 are pushed by the rim portion of the tether housing portion defining the tether inserting aperture 86 so that the distance between the two points, which becomes large as the two points approach the tip 60*b* of the tether, is restricted to the distance between the long sides of the tether inserting aperture 86. As a result, the rotational amount of the tether 60 about the center axis line 10*a* of the clip is returned to a nearly zero degree.

As a result, while the pillar garnish 80 is being moved in the removal direction from the tether clip 10, perpendicularity between the longitudinal direction of the anchor 62 and the longitudinal direction of the tether inserting aperture 86 is maintained. Therefore, when the anchor 62 is brought into contact with the bottom wall 84 of the tether housing portion, the longitudinal direction of the anchor 62 and the longitudinal direction of the tether inserting aperture 86 are prevented from coinciding with each other, so that the anchor 62 is prevented from passing through the tether inserting aperture 86. As a result, the pillar garnish 80 is prevented from being freely moved into the passenger compartment.

The above-described structures and technical advantages of the tether clip 10 and the structure 1 for coupling the tether clip to the pillar garnish according to the first embodiment, especially the structures and technical advantages relating to the pair of guide plates 64 and the opposing two sides 64*a*, are applicable to the second and third embodiments.

The first embodiment may further have the structures and technical advantages described below, especially, structures and technical advantages relating to an elastic branch 66.

For enabling the tether clip 10 having the pair of guide plates 64 to be installed to the pillar garnish 80, in order to rotate the tether 60 by ninety degrees after having let the anchor 62 pass through the tether inserting aperture 86, it is necessary to provide a gap larger than a thickness of the bottom wall 84 of the tether housing portion between an anchor-side end of the pair of guide plates 64 and the anchor 62 in a state where the anchor 62 is parallel to the bottom wall 84 of the tether housing portion. However, when a tether portion located between the pair of guide plates 64 and the anchor 62 comes to the tether inserting aperture 86 of the bottom wall 84 of the tether housing portion, there is a fear that the tether 60 is rotated about the center axis line 10*a* of the clip, because rotational restriction by the pair of guide plates 66 is ineffective. In order to restrict rotation of the tether 60, it is necessary for the tether 60 to have some rotation-stopping structure for stopping rotation of the tether 60 about the center axis line 10*a* of the clip or relative to the bottom wall 84 of the tether housing portion at the portion located between the anchor-side end of the pair of guide plates 64 and the anchor 62.

As the rotation-stopping structure, in the first embodiment, a pair of elastic branches 66 is provided at the tether portion 60*g* located between the pair of guide plates 64 and the anchor 62. Each elastic branch 66 is provided on each side of the tether portion 60*g*. Each elastic branch 66 extends along the same plane as the plane along which the pair of guide plates 64 extends. Therefore, the pair of elastic branches 66 extends in the direction perpendicular to the longitudinal direction of the anchor 62. A configuration of the pair of elastic branches 66 when viewed from an anchor side in the direction parallel to the tether extending direction is a rectangle.

The shape of the pair of elastic branches 66 and the shape of the tether inserting aperture 86 have a relationship described below. More particularly, the long side of the tether inserting aperture 86 is longer than a long side of the pair of elastic branches 66, and the short side of the tether inserting aperture 86 is longer than a short side of the pair of elastic branches 66. Therefore, the pair of elastic branches 66 can pass through the tether inserting aperture 86 by causing a longitudinal direction of the pair of elastic branches 66 to coincide with the longitudinal direction of the tether inserting aperture 86.

Each elastic branch 66 diverges from a portion of the tether portion 60*g* spaced from the anchor 62 more than the thickness of the bottom wall 84 of the tether housing portion 82. Each elastic branch 66 extends straight or curvedly in a direction away from the tether portion 60*g* and toward the anchor 62, and ends at a portion a little spaced from the anchor 62.

When coupling the tether clip 10 to the pillar garnish 80, the longitudinal direction of the anchor 62 and the longitudinal direction of the tether inserting aperture 86 are made coincident with each other, and then the anchor 62 is caused to pass through the tether inserting aperture 86. At that time, the pair of elastic branches 66 is pressed against an outside surface of the bottom wall 84 of the tether housing portion so as to be elastically deformed to be flat so that the tether 60 can be rotated by ninety degrees.

Technical advantages of the pair of elastic branches 66 are as follows:

At the time of coupling the tether clip 10 to the pillar garnish 80, since the tether clip 10 is rotated by ninety degrees relative to the pillar garnish 80 by placing the rim portion of the tether housing portion between the pair of guide plates 64 and the anchor 62, a gap is required to be provided between the pair of guide plates 64 and the anchor 62. When the pillar garnish 80 is moved in the removal direction from the tether clip 10 at the time of deployment of the CSA 88 and at last the anchor 62 is brought into contact with the inside surface of the bottom wall of the tether housing portion, the rim portion of the tether housing portion defining the tether inserting aperture has just come to a position corresponding to the tether portion located between the pair of guide plates 64 and the anchor 62. Therefore, the pair of guide plates 64 is ineffective to stop rotation of the tether 60, so that there is a fear that the tether 60 rotates relative to the tether inserting aperture 86.

However, since the pair of elastic branches 66 is provided, when the anchor 62 is brought into contact with the inside surface of the bottom wall of the tether housing portion, the pair of elastic branches 66 has entered the tether inserting aperture 86, so that rotation of the tether 60 relative to the tether inserting aperture 86 is prevented. As a result, even when the anchor 62 contacts the inside surface of the bottom wall 84 of the tether housing portion, perpendicularity between the longitudinal direction of the anchor 62 and the longitudinal direction of the tether inserting aperture 86 is maintained, so that the anchor 62 is prevented from passing through the tether inserting aperture 86.

A difference between effects of the pair of guide plates 64 and effects of the pair of elastic branches 66 will be explained below.

The pair of guide plates 64 operates to prevent the tether 60 from being rotated about the center axis line 10a of the clip by nearly ninety degrees during movement of the pillar garnish 80 in the removal direction from the tether clip 10. The pair of guide plates 64 also operates to return the rotational amount of about ninety degrees by which the tether 60 has been rotated to a nearly zero degree.

In contrast, the pair of elastic branches 66 operates to prevent the tether 60 from being rotated about the center axis line 10a of the clip and the anchor 62 from being rotated relative to the tether inserting aperture 86, when the pillar garnish 80 has been moved in the removal direction from the tether clip 10 and the anchor 62 has been brought into contact with the rim portion of the tether housing portion defining the tether inserting aperture, i.e., when the pair of guide plates 64 is ineffective as a rotational stopper.

Second Embodiment

Next, structures of the tether clip 10 according to a second embodiment and the structure 1 for coupling the tether clip to a pillar garnish will be explained with reference to FIGS. 18 and 19 and FIGS. 22 and 23.

The portions stated applicable also to the second embodiment among the structures and technical advantages of the first embodiment, especially the structures and technical advantages relating to the pair of guide plates 64 can be applied to the second embodiment. In the explanation below, among the structures and technical advantages of the second embodiment, portions different from those of the first embodiment will be mainly explained.

First, structures of the second embodiment will be explained.

In the second embodiment, a protrusion 64d protruding in a direction toward the anchor 62 is formed at a portion opposing the anchor 62, of each guide plate of the pair of guide plates 64 provided at the tether intermediate portion 60a.

One protrusion 64d is provided at each guide plate of the pair of guide plates 64. Thus, a pair of protrusions 64d is provided at the pair of guide plates 64. When either one protrusion of the pair of protrusions 64d enters the tether inserting aperture 86 provided at the bottom wall 84 of the tether housing portion 82, not only rotation of the tether 10 about the center axis line 10a of the clip but also rotation of the tether 10 relative to the bottom wall 84 of the tether housing portion 82 are restricted. Therefore, the protrusion 64d operates as a rotational stopper for restricting not only rotation of the tether 10 about the center axis line 10a of the clip but also rotation of the tether 10 relative to the bottom wall 84 of the tether housing portion 82.

In the second embodiment, since the pair of protrusions 64d is provided, the pair of elastic branches 66, which operates as a rotational stopper in the first embodiment, is not provided.

An outside surface of each protrusion of the pair of protrusions 64 on a side further from the tether intermediate portion 60a extends on an extension of each side of the opposing two sides 64a of the pair of guide plates 64. As illustrated in FIG. 18, a tip portion of each protrusion of the pair of protrusions 64 is rounded. Respective protrusions of the pair of protrusions 64 are symmetric with each other with respect to a center line of symmetry which is equal to a center line of the tether portion 60f.

The reason why the outside surface of each protrusion of the pair of protrusions 64 is to be located on the extension of each side of the opposing two sides 64a of the pair of guide plates 64 is that at the time of deployment of the CSA, the rim portion of the bottom wall 84 of the tether housing portion defining the tether inserting aperture can be smoothly moved sliding from the opposing two sides 64a of the pair of guide plates 64 to the outside surfaces of the pair of protrusions 64d. Another reason is that when the rim portion of the bottom wall 84 of the tether housing portion defining the tether inserting aperture has been smoothly moved from the opposing two sides 64a of the pair of guide plates 64 to the outside surfaces of the pair of protrusions 64d, the outside surfaces of the pair of protrusions 64d are even better at performing that function, conducted by the two sides 64a of the pair of guide plates 64, to return the rotational angle of the tether about the center axis line 10a of the clip to a nearly zero degree.

A thickness of the pair of guide plates 64 and a thickness of the pair of protrusions 64d in the direction perpendicular to the plane along which the tether 60 extends are made equal or substantially equal to each other. In the case where the thickness of the pair of guide plates 64 and the thickness of the pair of protrusions 64d are made equal or substantially equal to each other, a bending rigidity in the direction perpendicular to the plane along which the tether 60 extends, of the pair of protrusions 64d can be made as high as that of the pair of guide plates 64.

A space is provided between an anchor-side end of the protrusion 64d of each guide plate of the pair of guide plates 64 and the anchor 62. The space is determined to be larger than a thickness of the bottom wall 84 of the tether housing portion 82 and to have a size to enable the protrusion 64d of at least one guide plate of the pair of guide plates 64 to enter the tether inserting aperture 86 when a center axis line of the tip 60b of the tether is inclined relative to a line perpendicular to the bottom wall 84 of the tether housing portion 82.

As a result, as illustrated in FIG. 18, in a state where a center line of the tip 60b of the tether is perpendicular to the bottom wall 84 of the tether housing portion 82 and a guide plate-side surface of the anchor 62 closely contacts an inside surface of the bottom wall 84 of the tether housing portion 82, a gap "G" of a small size is formed between the anchor-side end of each protrusion 64d of each guide late 64 and an outside surface of the bottom wall 84 of the tether housing portion 82.

The reason why the space provided between the anchor-side end of the protrusion 64d of each guide plate of the pair of guide plates 64 and the anchor 62 is made larger than the thickness of the bottom wall 84 of the tether housing portion 82 is that at the time of coupling the tether clip 10 to the tether housing portion 82 of the pillar garnish 80, after making the longitudinal direction of the anchor 62 coincide with the longitudinal direction of the tether inserting aperture 86 and causing the anchor 62 to pass through the tether inserting aperture 86, the anchor 62 can be rotated by ninety degrees about the center axis line of the tip of the tether. By rotating the anchor 62 by ninety degrees about the center axis line of the tip of the tether, the pair of guide plates 64 can be inserted into the tether housing portion 82 through the tether inserting aperture 86.

The reason why the size of the gap "G" is made small is that at the time of deployment of the CSA 88, when the tether 60 is stretched to be substantially straight and the bottom wall 84 of the tether housing portion 82 is brought into contact with the anchor 62, the tether portion 60g is likely to be inclined relative to the direction perpendicular to the bottom wall 84 of the tether housing portion 82 due to a bias of the straightly stretched tether 60 to an original curved, figure, so that one guide plate of the pair of protrusions 64b formed at the pair of guide plates 64 enters the tether inserting aperture 86 to thereby operate as a rotational stopper.

At the portion of each guide plate of the pair of guide plates 64 opposing the anchor 62 and located closer to the tether intermediate portion 60a than the protrusion 64d, a concavity 64e concave in a direction further away from the anchor 62 than the anchor-side end of the protrusion 64d is formed.

Figure 22:
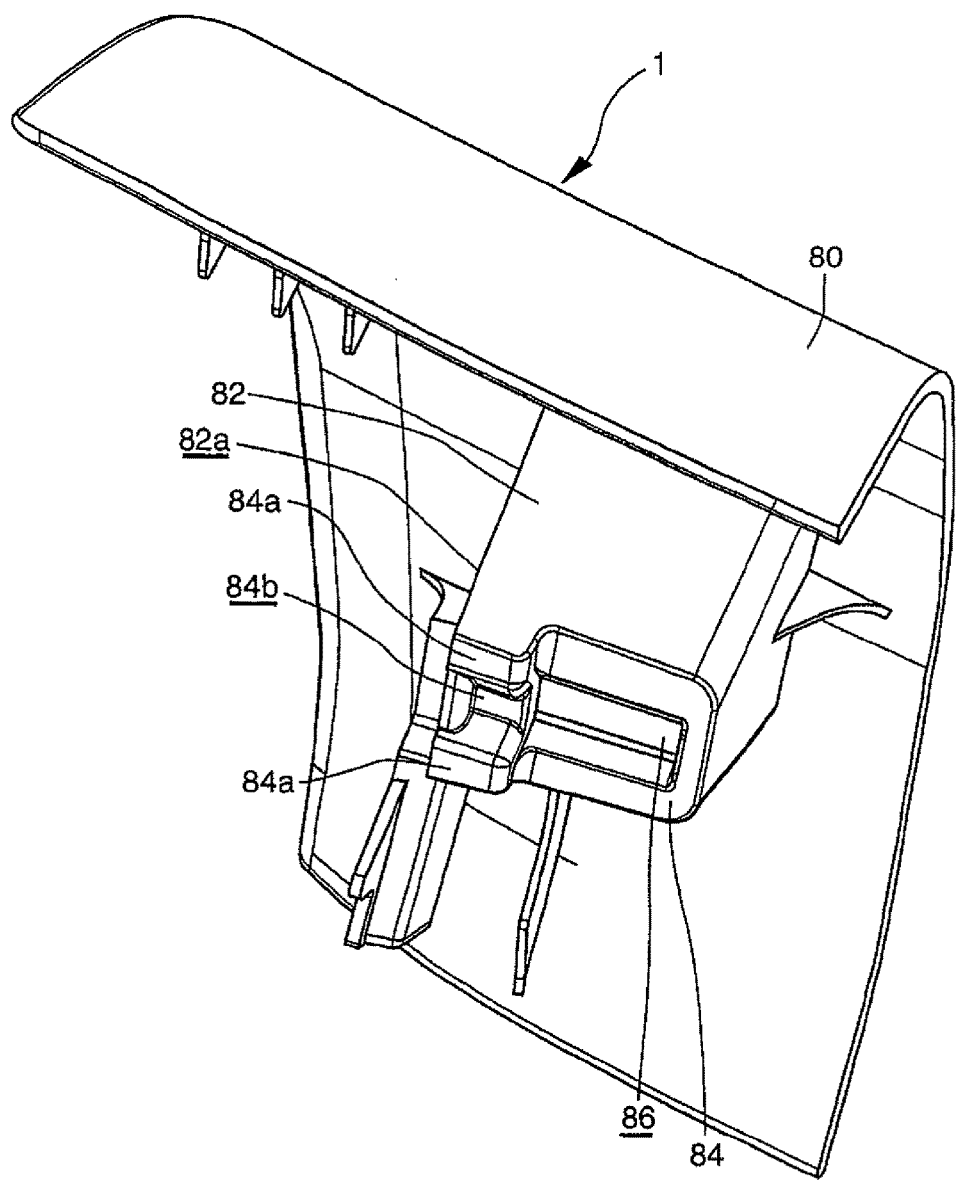
FIG. 22 is a perspective view of a rotational stopper provided at an outside surface of a bottom wall of a tether housing portion and a vicinity thereof, in the structure for coupling the tether clip of the second embodiment to the pillar garnish.
Figure 23:
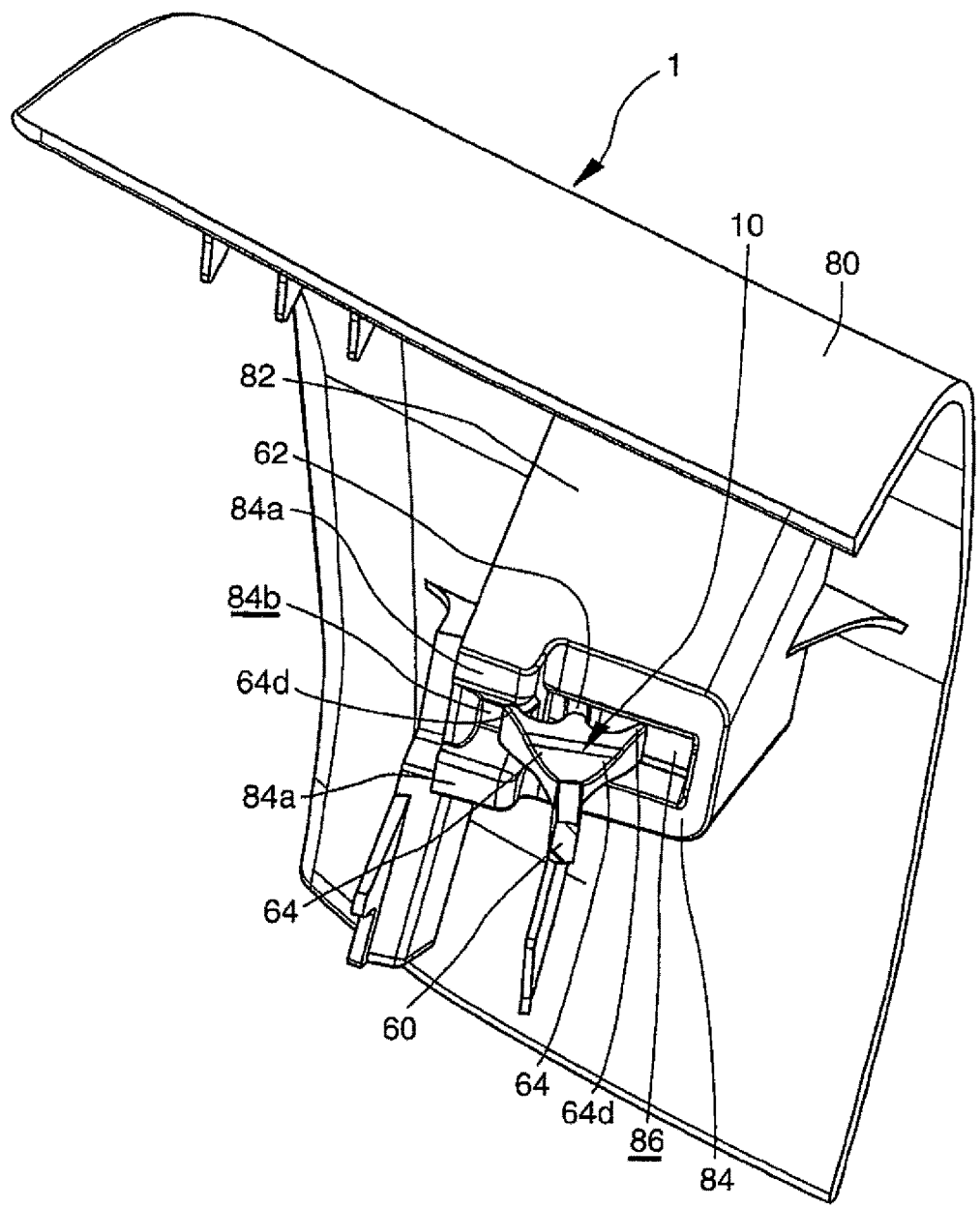
FIG. 23 is a perspective view of the rotational stopper provided at the outside surface of the bottom wall of the tether housing portion and a vicinity of a protrusion of the tether clip engaging the rotational stopper, in the structure for coupling the tether clip of the second embodiment to the pillar garnish.

In the structure 1 for coupling the tether clip to the pillar garnish according to the second embodiment, as illustrated in FIGS. 22 and 23, at an outside surface (i.e., a surface opposing the pillar 90) of the bottom wall 84 of the tether housing portion 82, a rotational stopper 84a, with which the protrusion 64d of the pair of guide plates 64 can be brought into engagement and which stops rotation of the tether 60 relative to the bottom wall 84 of the tether housing portion 82 when the protrusion 64a of the pair of guide plates 64 engages the rotational stopper 84a, is provided.

The rotational stopper 84a is provided at a portion of the outside surface of the bottom wall 84 of the tether housing portion located between one end of the tether inserting aperture 86 and an opening 82a-side end of the tether housing portion 82. The rotational stopper 84a extends outward (i.e., in the direction toward the pillar 90) from the outside surface of the bottom wall 84 of the tether housing portion. The rotational stopper 84a has a groove 84b having a width capable of receiving the protrusion 64d of the pair of guide plates 64 therein at a central portion of the rotational stopper. A center line of the groove 84b and a longitudinal center line of the tether inserting aperture 86 coincide with each other.

At the time of deployment of the CSA 88, when the anchor 62 is brought into contact with the bottom wall 84 of the tether housing portion, as illustrated in FIG. 18, one of the protrusions 64d of the pair of guide plates 64 gets in the tether inserting aperture 86 and the other of the protrusions 64d of the pair of guide plates 64 gets out of the tether inserting aperture 86. However, as illustrated in FIGS. 22 and 23, the other protrusion 64d getting out of the tether inserting aperture 86 engages the rotational stopper 84a.

Next, technical advantages of the second embodiment will be explained. Since the protrusions 64d are provided to the pair of guide plates 64, even if the elastic branches 66 described in the first embodiment are not provided, rotation of the tether 60 about the center axis line 10a of the clip and rotation of the tether 60 relative to the bottom wall 84 of the tether housing portion can be prevented.

In more detail, at the time of deployment of the CSA, the pillar garnish 80 is moved in the direction away from the pillar 90, while rotation of the tether 60 relative to the bottom wall 84 of the tether housing portion is being restricted by the pair of guide plates 64. Since the pair of protrusions 64d is provided to the pair of guide plates 64, the pair of protrusions 64d enters the tether inserting aperture 86 following the pair of guide plates 64. As a result, by the pair of protrusions 64d, rotation of the tether 60 about the center axis line 10a of the clip and rotation of the tether 60 relative to the bottom wall 84 of the tether housing portion 82 are restricted.

Since the tether 60 is curved at the tether intermediate portion 60a, for example, at the curved portion 60e, when the pillar garnish 80 is moved in the direction away from the pillar 90 reforming the curving direction of the tether 60 to an opposite-curving direction, a biasing force acts to the tether 60 in the curving direction. As a result, the pair of guide plates 64 is inclined relative to the bottom wall 84 of the tether housing portion due to the biasing force. Due to the inclination, one of the pair of protrusions 64d gets into the tether inserting aperture 86 and prevents rotation of the tether 60 about the center axis line 10a of the clip and rotation of the tether 60 relative to the bottom wall 84 of the tether housing portion 82.

Since the gap "G" provided between the protrusions 64d and the outside surface of the bottom wall of the tether housing portion is set small, when the center line of the tip of the tether 60 is inclined from a line perpendicular to the bottom wall 84 of the tether housing portion, even if the inclination angle is small, the one protrusion 64d can enter the tether inserting aperture 86.

Since the space provided between the protrusion 64d and the anchor 62 is set larger than the thickness of the bottom wall 84 of the tether housing portion, the tether 60 can be coupled to the tether housing portion 82. In the coupling, after the anchor 62 has passed through the tether inserting aperture 86 and has entered the tether housing portion 82, the tether 60 is rotated about the center line of the tip of the tether by ninety degrees, keeping a state where the center line of the tip of the tether 60 is perpendicular to the bottom wall 84 of the tether housing portion. After the rotating, the pair of guide plates 64 is inserted into the tether housing portion 82 through the tether inserting aperture 86.

Since the concavity 64e is provided at guide plate portions of the guide plates 64 located closer to the tether intermediate portion 60a than the protrusions 64d, a material shrinkage of the thick guide plate portions during forming and a deformation of the protrusions 64d due to the material shrinkage of the thick guide plate portions are suppressed. As a result, a high dimensional accuracy of the protrusions 64d can be obtained.

In the case where the rotational stopper 84d is provided at the outside surface of the bottom wall 84 of the tether housing portion 82, one of the pair of protrusions 64d enters the tether housing aperture 86 and the other of the pair of protrusions 64d engages the rotational stopper 84d formed at the bottom wall 84 of the tether housing portion. As a result, rotation of the tether 60 relative to the bottom wall 84 of the tether housing portion is surely restricted.

Third Embodiment

Next, structures of the tether clip 10 according to a third embodiment and the structure 1 for coupling the tether clip to a pillar garnish will be explained with reference to FIGS. 20 and 21.

The portions stated applicable also to the third embodiment among the structures and technical advantages of the first embodiment, especially the structures and technical advantages relating to the pair of guide plates 64 can be applied also to the third embodiment.

The portions stated applicable also to the third embodiment among the structures and technical advantages of the second embodiment, especially the structures and technical advantages relating to the pair of protrusions 64d may be applied also to the third embodiment, though they may not be shown in connection with the third embodiment.

In the explanation below, among the structures and technical advantages of the third embodiment, portions different from those of the first embodiment and the second embodiment will be mainly explained.

First, structures of the third embodiment will be explained.

In the third embodiment, the tether intermediate portion 60a includes a first portion 60h extending from the seat-side end 60c of the tether in a direction upward and away from the anchor 62, a second portion 60i extending from an upper end of the first portion 60h in a direction upward and toward the anchor 62, a third portion 60j extending from an upper end of the second portion 60i in a direction downward and toward the anchor 62, and a fourth portion 60k extending from a lower end of the third portion 60j up to the tip 60b of the tether in the direction upward and toward the anchor 62.

Each of the first portion 60h, the second portion 60i, the third portion 60j and the fourth portion 60k may extend curved or straight, or may extend curved at one portion and straight at another portion. Connecting portions located between any two portions among the first portion 60h, the second portion 60i, the third portion 60j and the fourth portion 60k may be curved smoothly or bent.

As illustrated in FIG. 20, the tether intermediate portion 60a is curved in right-left and up-down directions along the plane along which the tether 60 extends, whereby a length of the tether 60 is large. The length of the tether 60 in the third embodiment is larger than those in the first and second embodiments.

At least at one portion of the first portion 60h, the second portion 60i and the third portion 60j of the tether intermediate portion 60a, more desirably at the third portion 60j, at least one guide plate of a second guide plate 76 and a third guide plate 78 is provided. The second guide plate 76 and the third guide plate 78 extend along the plane along which the tether 60 extends, and extend in opposite directions to each other placing the tether intermediate portion 60a therebetween. The pair of (first) guide plates 64 is provided at the fourth portion 60k of the tether intermediate portion 60a.

Figure 21:
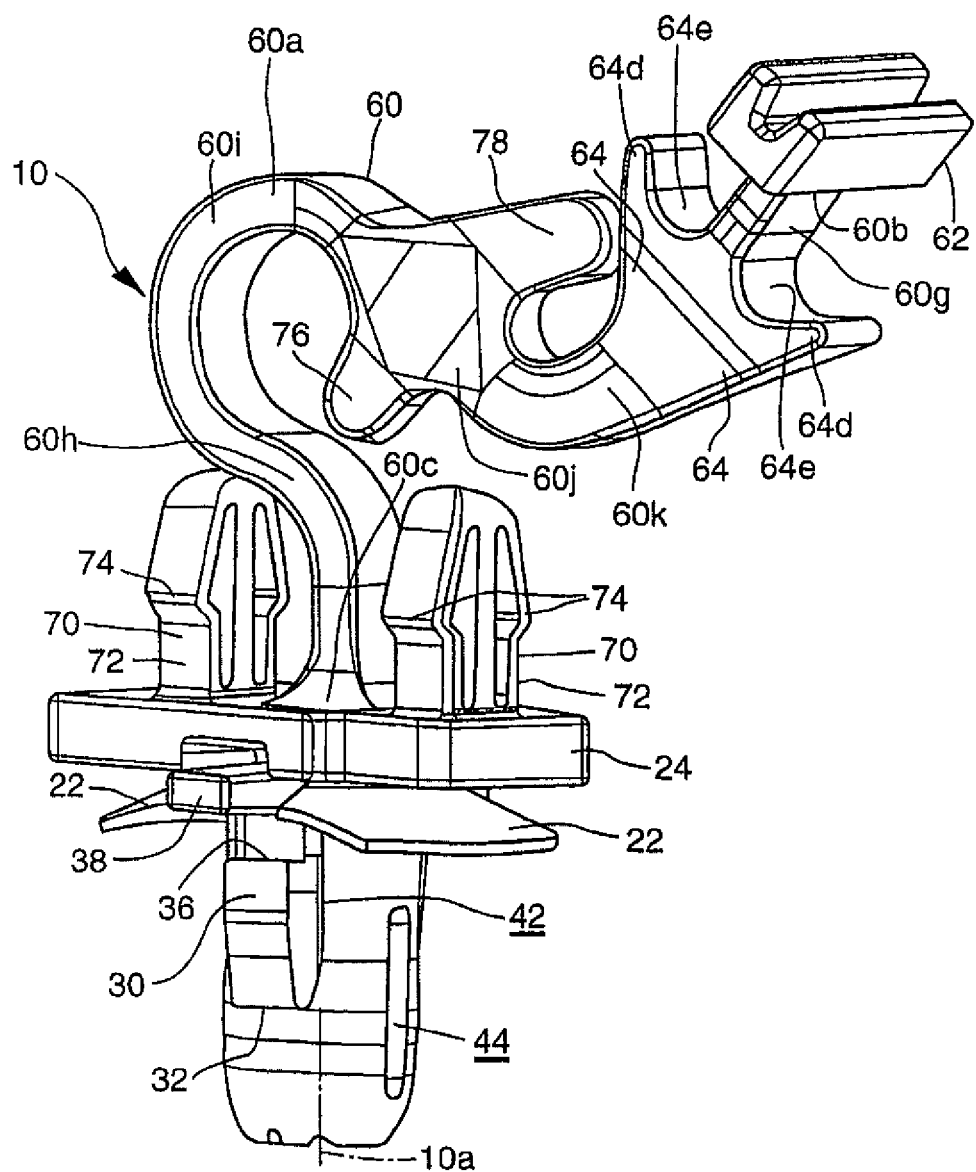
FIG. 21 is a perspective view of the tether clip of FIG. 20.

FIGS. 20 and 21 show the case where the second guide plate 76 and the third guide plate 78 are provided at the third portion 60j. At the time of deployment of the CSA 88, while the tether 60 is being stretched from the curved state to a straight state, the pillar garnish 80 is moved so as to be drawn from the tether clip 10. At that time, as illustrated in FIG. 20, the second guide plate 76 firstly enters the tether inserting aperture 86 of the bottom wall 84 of the tether housing portion, then the third guide plate 78 enters the tether inserting aperture 86 of the bottom wall 84 of the tether housing portion, and finally the pair of (first) guide plates 64 enters the tether inserting aperture 86 of the bottom wall 84 of the tether housing portion. In the case where the protrusions 64d are provided to the pair of guide plates 64, even if portions of the guide plates other than the protrusions 64d disengage the tether inserting aperture 86 of the bottom wall 84 of the tether housing portion, one protrusion 64d of the pair of protrusions 64d engages the rim portion of the tether housing portion defining the tether inserting aperture 86. Therefore, in spite of the fact that tether 60 is made long, rotation of the tether 60 about the center axis line 10a of the clip relative to the bottom wall 84 of the tether housing portion is almost always suppressed.

The at least one guide plate of the second guide plate 76 and the third guide plate 78 (or each of the second guide 76 and the third guide plate 78 in the case where both the second guide 76 and the third guide plate 78 are provided) is discontinuous with the guide plate 64 provided at the fourth portion 60k in the direction in which the tether intermediate portion 60a extends. Due to the discontinuous structure, a tether portion located between the at least one guide plate of the second guide plate 76 and the third guide plate 78 (or each of the second guide 76 and the third guide plate 78 in the case where both the second guide 76 and the third guide plate 78 are provided) and the pair of guide plates 64 is flexible and deformable.

Next, technical advantages of the third embodiment will be explained. Since the tether intermediate portion 60a includes the first portion 60h, the second portion 60i, the third portion 60j and the fourth portion 60k, the tether 60 can be curved in the right-left and up-down directions as shown in FIG. 20, so that the length of the tether can be made large. As a result, an opening amount of the pillar garnish 80 from the pillar 90 at the time of deployment of the CSA can be made large, so that the CSA 88 can be easily and surely expanded and deployed.

Since at least one of the first portion 60h, the second portion 60i and the third portion 60j of the tether intermediate portion 60a is provided with at least one guide plate of the second guide plate 76 and the third guide plate 78, in spite of the fact that the tether 60 is made long, the at least one guide plate of the second and third guide plates 76 and 78 can engage the tether inserting aperture 86, so that rotation of the tether 60 about the center axis line 10a of the clip can be prevented.

Since the second and third guide plates 76 and 78 are discontinuous with the pair of (first) guide plates 64, in spite of the fact that the second and third guide plates 76 and 78 are provided, flexibility of the tether 60 is obtained. As a result, the effect obtained by the structure that the tether 60 is made long, that is, the effect that the opening amount of the pillar garnish 80 from the pillar 90 at the time of deployment of the CSA is made large can be surely obtained.

The invention claimed is:

1. A structure comprising:
   a pillar garnish having a tether housing portion provided with a bottom wall having a tether inserting aperture, and
   a tether clip coupled to the pillar garnish and including a tether and an anchor, the tether including a tip, a seat-side end and a tether intermediate portion, the tether extending along one plane, the anchor being connected to the tip of the tether and extending in a direction perpendicular to the one plane, wherein
   the tether intermediate portion includes a pair of guide plates extending parallel to the one plane, respective guide plates of the pair of guide plates extending in directions away from the tether intermediate portion and opposite to each other, the tether intermediate portion including:
   a first portion extending in a direction upward and away from the anchor from the seat-side end;
   a second portion extending in a direction upward and toward the anchor from an upper end of the first portion;
   a third portion extending in a direction downward and toward the anchor from an upper end of the second portion; and
   a fourth portion extending in the direction upward and toward the anchor from a lower end of the third portion to the tip of the tether,
   the pair of guide plated is provided at the fourth portion of the tether intermediate portion,
   the pair of guide plates has two sides located on opposite sides of a guide plate-provided portion of the tether intermediate portion and opposing each other, and a distance between points located on the two sides increases, as the points located on the two sides approach the tip of the tether,
   a protrusion protruding in a direction toward the anchor is formed at a portion of each guide plate of the pair of guide plates opposing the anchor, the protrusion being nearly rigid, and
   a space is provided between an anchor-side end of the nearly rigid protrusion and the anchor, the space being larger than a thickness of the bottom wall of the tether housing portion.

2. The structure according to claim 1, wherein the space causes the protrusion of at least one guide plate of the pair of guide plates to enter the tether inserting aperture when a center line of the tip of the tether is inclined relative to a line perpendicular to the bottom wall of the tether housing portion.

3. The structure according to claim 1, wherein at the portion of each guide plate of the pair of guide plates opposing the anchor, and at a portion of each guide plate of the pair of guide plates closer to the tether intermediate portion than the protrusion, a concavity concave in a direction further away from the anchor than the anchor-side end of the protrusion is formed.

4. The structure according to claim 1, wherein at least one portion of the first, second and third portions of the tether intermediate portion is provided with at least one of a second guide plate and a third guide plate which place the tether intermediate portion therebetween and extend in directions opposite to each other.

5. The structure according to claim 4, wherein the at least one of the second guide plate and the third guide plate is discontinuous with the pair of guide plates provided at the fourth portion in a direction along an extending direction of the tether intermediate portion.

6. The structure according to claim 1, wherein
   the anchor has a rectangular configuration,
   the tether inserting aperture is rectangular, and
   the tether clip is coupled to the pillar garnish such that an extending direction of the tether coincides with a longitudinal direction of the pillar garnish,
   a long side of the tether inserting aperture is longer than a maximum of the distance between the opposing two sides of the pair of guide plates, and
   a short side of the tether inserting aperture is shorter than the maximum of the distance between the opposing two sides of the pair of guide plates.

7. The structure according to claim 6, wherein
   the tether housing portion includes an opening directed in a longitudinal direction of the pillar garnish, and
   the tether extends from an interior to an exterior of the tether housing portion and the anchor is located outside the tether housing portion in a state where the tether clip has been coupled to the pillar garnish.

8. The structure according to claim 6, wherein
   at an outside surface of the bottom wall of the tether housing portion, a rotational stopper, which the protrusion can be brought into engagement with and which stops rotation of the tether relative to the bottom wall of the tether housing portion when the protrusion engages the rotational stopper, is provided.

* * * * *